US008045766B2

(12) United States Patent
Ishida et al.

(10) Patent No.: US 8,045,766 B2
(45) Date of Patent: Oct. 25, 2011

(54) DEVICE, PROGRAM, AND METHOD FOR DETERMINING SLEEPINESS

(75) Inventors: Kenji Ishida, Nagoya (JP); Kahori Uchiyama, Nisshin (JP); Teiyuu Kimura, Nisshin (JP); Noriyuki Ozaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 881 days.

(21) Appl. No.: 12/068,770

(22) Filed: Feb. 12, 2008

(65) Prior Publication Data
US 2008/0212828 A1  Sep. 4, 2008

(30) Foreign Application Priority Data

Feb. 16, 2007 (JP) ................. 2007-036386
Jul. 23, 2007 (JP) ................. 2007-191098
Oct. 24, 2007 (JP) ................. 2007-276551

(51) Int. Cl.
*G06K 9/46* (2006.01)
(52) U.S. Cl. ....................................... 382/118
(58) Field of Classification Search .......... None
See application file for complete search history.

(56) References Cited

U.S. PATENT DOCUMENTS

| 5,573,006 | A  | * | 11/1996 | Shimotani et al. | 600/558 |
| 5,878,156 | A  | * | 3/1999  | Okumura | 382/118 |
| 6,097,295 | A  | * | 8/2000  | Griesinger et al. | 340/576 |
| 6,243,015 | B1 | * | 6/2001  | Yeo | 340/576 |
| 7,692,551 | B2 | * | 4/2010  | Bonefas et al. | 340/575 |
| 7,830,266 | B2 | * | 11/2010 | Nakagoshi et al. | 340/576 |
| 2005/0024212 | A1 | * | 2/2005 | Hultzsch | 340/575 |
| 2005/0163383 | A1 | * | 7/2005 | Kim et al. | 382/209 |
| 2007/0159344 | A1 | * | 7/2007 | Kisacanin | 340/576 |
| 2008/0101659 | A1 | * | 5/2008 | Hammoud et al. | 382/118 |

FOREIGN PATENT DOCUMENTS

| JP | A-3-32647    | 2/1991  |
| JP | A-05-060515  | 3/1993  |
| JP | A-07-032995  | 2/1995  |
| JP | A-07-181012  | 7/1995  |
| JP | A-09-198508  | 7/1997  |
| JP | A-09-270010  | 10/1997 |
| JP | A-2000-172966 | 6/2000 |
| JP | A-2000-198369 | 7/2000 |
| JP | A-2001-043345 | 2/2001 |
| JP | A-2004-89272  | 3/2004 |

(Continued)

OTHER PUBLICATIONS

Notice of Rejection issued from the Japanese Patent Office mailed on Jul. 21, 2009 in the corresponding Japanese patent application No. 2007-276551 (and English translation).

*Primary Examiner* — Brian Werner
(74) *Attorney, Agent, or Firm* — Posz Law Group, PLC

(57) ABSTRACT

A sleep prevention system captures a facial image of a driver, determines a sleepiness level from the facial image and operates warning devices including neck air conditioner, seatbelt vibrator, and brake controller if necessary based on the sleepiness determination. A sleepiness determination device determines sleepiness from facial expression information such as distances between corners of a mouth, distance between an eyebrow and eye, tilt angle of a head, and other facial feature distances. The facial distances are calculated from captured images and from reference information gather during wakefulness. The sleepiness degree is determined based on the determination results including combinations thereof.

9 Claims, 20 Drawing Sheets

FOREIGN PATENT DOCUMENTS

| | | |
|---|---|---|
| JP | A-2004-341954 | 12/2004 |
| JP | A-2005-028916 | 2/2005 |
| JP | A-2005-251224 | 9/2005 |
| JP | A-2006-69358 | 3/2006 |
| JP | A-2006-123136 | 5/2006 |
| JP | A-2006-247055 | 9/2006 |

* cited by examiner (a) 2D MODEL (b) 3D MODEL

DEVICE, PROGRAM, AND METHOD FOR DETERMINING SLEEPINESS

CROSS REFERENCE TO RELATED APPLICATIONS

The present invention is based on and claims priority to Unpublished Japanese Application No. 2007-036386, filed on Feb. 16, 2007, Unpublished Japanese Application No. 2007-191098, filed on Jul. 23, 2007, and Unpublished Japanese Application No. 2007-276551, filed on Oct. 24, 2007 the entire contents of each of which is incorporated herein by reference.

BACKGROUND OF THE INVENTION

1. Field of the Invention

The present invention is related to determining sleepiness and, in particular, to determining sleepiness based on motion analysis of a face of a target person.

2. Description of Related Art

Sleeping by a driver of a moving vehicle is undeniably dangerous. Proposals to prevent sleeping having included suggestions for devices for capturing a face of the driver by use of a camera mounted in the vehicle and for processing the obtained image to determine a degree of sleepiness. Usually, in such devices, the eyes of the driver are specified from the obtained image, an opening and line of sight of the eyes is detected from the image, and the presence or absence of sleepiness is determined from the detection result. For example, a device in which an opening of eyes is detected sequentially to determine whether a target person is asleep more precisely has been suggested in accordance with JP-A-11-66304.

However, problems with the above described method exist in that eye movement often changes in accordance with situation where a vehicle is traveling. For example, when the sunlight enters the eyes of the driver, the driver squints in many cases regardless of a level of sleepiness. Other eye based indications such as the frequency of mirror checking or confirmation by the driver on an expressway are unreliable since indications on a highway, busy town or city can differ from a mirror checking frequency that might be used by the same driver on a small road or in a small town regardless of sleepiness.

Still further complicating detection is the problem that eye movement relates generally to a sleepiness level of the target person directly, but as described above, many disturbances to the determination of a degree of sleepiness occur. Therefore, many countermeasures are needed for determining a degree of sleepiness from only eyes.

SUMMARY OF THE INVENTION

For addressing the above described drawbacks associated with conventional methods, devices and systems, an object of the present invention is to provide a device, program, and method for determining a degree of sleepiness without influence of disturbance to the determination of a degree of sleepiness.

A sleepiness determination device for addressing the above problem can be configured to obtain at least two or more pieces of facial expression information. The pieces of facial expression information can include a distance between left and right corners of a mouth, a distance between an eyebrow and eye, a tilt angle of a head, a distance between the midpoint between inner corners of eyebrows and the midpoint between inner corners of eyes, a distance between inner corners of eyebrows, a distance between the midpoint between outer corners of a lower nose and the midpoint between inner corners of eyes, a distance between the midpoint between corners of a mouth and the midpoint between inner corners of eyes, a distance between a lower end of a lower lip and the midpoint between inner corners of eyes, a distance between upper and lower eyelids, a distance between left and right outer corners of a lower nose, and a distance between an upper end of an upper lip and the midpoint between inner corners of eyes. The exemplary device, program and method can determine the presence or absence of sleepiness or a level of sleepiness from the obtained facial expression information, and determines a degree of sleepiness from a combination of results of the determinations.

Facial expression usually changes when a degree of sleepiness changes. FIG. 1 shows eleven facial or mimetic muscles typically associated with generating facial expressions. It will be appreciated that a mimetic muscle can be considered one of the numerous muscles that are attached to and move the skin of the face. The mimetic muscles are supplied with movement impulses by the facial nerve. The arrows in FIG. 1 show movement directions of skin when the mimetic muscles contract. It should be noted that when a degree of sleepiness changes, facial skin moves in response to relaxation and contraction of the mimetic muscles, and the facial expression thus changes. When sleepiness becomes strong, the head cannot be maintained upright, and thus tilts.

Accordingly, by measuring a tilt angle of the head and distances between feature points of the face reflecting movement of the mimetic muscles due to sleepiness, a degree of sleepiness can be determined. A sleepiness determination device having a structured to be defined in greater detail hereinafter can determine a degree of sleepiness from two or more pieces of the facial expression information such as described hereinabove.

In accordance with various exemplary embodiments therefore, information other than eye information can be used for determining a degree of sleepiness regardless of disturbance to the eye information.

In the sleepiness determination device, a degree of sleepiness is determined by combination of at least two results of determining the presence or absence of sleepiness or a level of sleepiness from the facial expression information. A change of each piece of the facial expression information shows a different degree of sleepiness, according for example to the experimental results described hereinbelow.

For example, it has been determined experimentally that a distance between corners of a mouth changes in response to slight sleepiness, a distance between an eyebrow and eye changes in response to moderate sleepiness, and a tilt angle of a head changes in response to strong sleepiness. Accordingly, since multiple degrees of sleepiness can be determined as from various combinations of the individual pieces of the information, more detailed and accurate determination of sleepiness is possible as compared to the determination of sleepiness using only a single piece of information.

A method for determining the presence or absence of sleepiness or a level of sleepiness from the obtained facial expression information, is not limited in its application. For example, a method for determining sleepiness based on whether values of a distance and angle shown in the obtained facial expression information are within a standard range, is possible. In accordance with various exemplary embodiments, a structure in which the facial expression information obtained during wakefulness and the facial expression information obtained at a timing for determining sleepiness are compared to each other to determine the presence or absence of sleepiness and a level of sleepiness is determined from combinations of results of the comparisons, is possible.

Since such a sleepiness determination device can detect a change of facial expression by comparing the facial expression information obtained at the determination timing to the facial expression information obtained during wakefulness, the presence or absence of sleepiness or a level of sleepiness can be determined appropriately and accurately.

A method for obtaining the above facial expression information is not limited to any one particular approach. For example, attaching an electrode to a face, detecting slight electricity generated in proportion to movement of the above mimetic muscles, and detecting the above facial expression information is possible.

It is further possible for an image of a face of a target person can further be captured to detect the above facial expression information by processing the captured facial image. In accordance with the present embodiment, an exemplary sleepiness determination device detects positional and angular information showing at least positions of features or components of a face or a tilt angle of a head in accordance with image data showing a facial image. The facial expression information can be obtained in accordance with the positional, angular information.

Such a sleepiness determination device can determine a degree of sleepiness from the image data showing a facial image captured by the imaging means. Accordingly, a degree of sleepiness can be determined easily without directly attaching an electrode for detecting the above facial expression information to a target person whose sleepiness is to be determined.

The sleepiness determination device may be mounted to a vehicle having the imaging means and can thereby determine a degree of sleepiness of a driver. In accordance with the image data showing a facial image captured by the imaging means, the above positional, angular information is detected, the facial expression information is obtained, and a degree of sleepiness may be determined from the positional, angular information and facial expression information.

In cooperation with the determination result of a degree of sleepiness that is provided in the vehicle by the sleepiness determination device, a device for preventing sleep of a driver can be provided. For example, in cooperation with a car navigation system, the sleepiness determination device can output a display on a screen thereof and a sound in accordance with the determination results of a degree of sleepiness. Further, in accordance with the determination results of the degree of sleepiness, a device for sending air to a driver, a device for vibrating a seatbelt, and a device for controlling a brake may be operated.

The above described method for determining a degree of sleepiness is not particularly limited. For example, the presence or absence of sleepiness is determined from the facial expression information, and a degree of sleepiness may be determined from the number of the determination results showing the presence of sleepiness and the number of the determination results showing the absence of sleepiness.

A sleepiness determination device in accordance with the present embodiment determines the presence or absence of sleepiness from the facial expression information, and determines a degree of sleepiness from a ratio of the facial expression information showing the presence of sleepiness relative to the facial expression information used for the determination.

Such a sleepiness determination device determines a degree of sleepiness from a ratio of the facial expression information showing the presence of sleepiness relative to the facial expression information used for the determination. Accordingly, the determination of sleepiness can reflect the results of determining the presence or absence of sleepiness from all the facial expression information. Accordingly, even when sleepiness is determined to be present wrongly due to facial expression information that has changed without sleepiness, a degree of sleepiness is determined also from the determination results obtained from the other facial expression information. As a result, the chance of an erroneous determination of a degree of sleepiness can be reduced.

Alternatively, a degree of sleepiness is determined from each piece of the facial expression information, and a degree of sleepiness may be determined from each determination result. In such a sleepiness determination device a level of sleepiness can be determined in accordance with each piece of the facial expression information, and determines a degree of sleepiness in accordance with combinations of the levels. Such as combined probabilities of sleepiness based on each of the results.

Further, such a sleepiness determination device can determine a degree of sleepiness in accordance with higher information having multiple steps into which sleepiness levels based on the facial expression information are classified. Accordingly, a degree of sleepiness can be determined accurately. The determination results associated with a level of sleepiness, for example, can be converted to a value, and a degree of sleepiness can be determined in accordance with a mean and mode of values based on all the facial expression information.

An exemplary sleepiness determination device in accordance with the present embodiment obtains at least two or more of a distance between corners of a mouth, a distance between an eyebrow and eye, and a tilt angle of a head. A sleepiness condition A is determined in accordance with a tilt angle of a head, a sleepiness condition B is determined in accordance with a distance between an eyebrow and eye, and a sleepiness condition C is determined in accordance with a distance between corners of a mouth. The exemplary sleepiness determination device determines a degree of sleepiness in accordance with the conditions.

More specifically, condition A is determined as strong sleepiness. Condition B without condition A is determined as moderate sleepiness, which is lower than the strong sleepiness. Condition C without conditions A and B is determined as slight sleepiness, which is lower than the moderate sleepiness. When none of the conditions A, B, and C are satisfied, no sleepiness is determined.

Alternatively, a first condition is determined as slight sleepiness. A second condition is determined as moderate sleepiness, which is higher than the slight sleepiness and can include the first condition. A third condition is determined as strong sleepiness, which is higher than the moderate sleepiness and can include the first and second conditions. When none of the conditions are satisfied, no sleepiness is determined.

As described above, a distance between corners of a mouth changes in case of slight sleepiness, a distance between an eyebrow and eye changes in case of moderate sleepiness, and a tilt angle of a head changes in case of strong sleepiness. Accordingly, in the sleepiness determination device using such a method, when the facial expression information obtaining means obtains information about all of a distance between corners of a mouth, distance between eyebrow and eye, and tilt angle of a head, four degrees of sleepiness: strong sleepiness; moderate sleepiness; slight sleepiness; and no sleepiness can be determined. When the facial expression information obtaining means obtains two pieces of the above information, three degrees of sleepiness can be determined including no sleepiness and two of the strong sleepiness, moderate sleepiness, and slight sleepiness.

A program such as software or the like in the form of instructions that can be carried on a computer readable medium, including a memory, a storage device, a communication channel or the like, allows a computer system to execute a procedure for the facial expression information obtaining means and sleepiness determination means.

The above program includes ordered strings of instructions for execution or processing by the computer system, and is served to the sleepiness determination device and a user using the sleepiness determination device via various recording mediums or communication lines as noted.

In accordance with another embodiment of the exemplary sleepiness determination method, the presence or absence of sleepiness or a level of sleepiness is determined in accordance with at least two of the above described factors such as a distance between left and right corners of a mouth; a distance between an eyebrow and eye; a tilt angle of a head; and the like.

DETAILED DESCRIPTION OF THE PREFERRED EMBODIMENTS

First Embodiment

Figure 1:
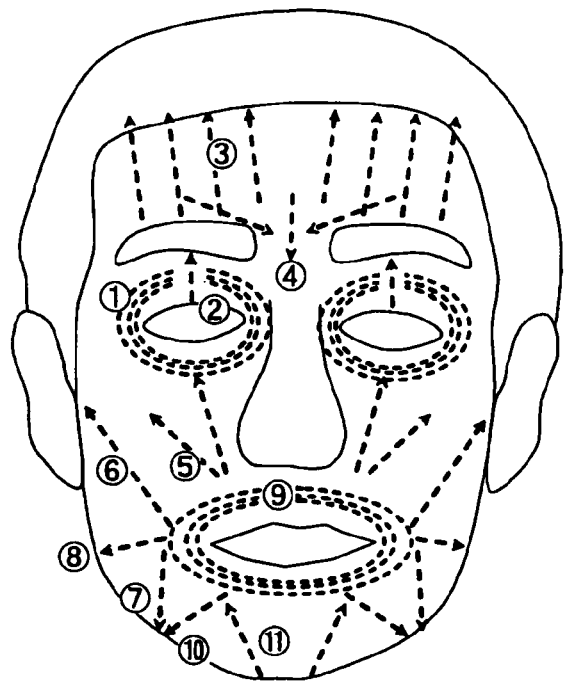
FIG. 1 is a diagram illustrating various mimetic muscles of the human face.
Figure 2:
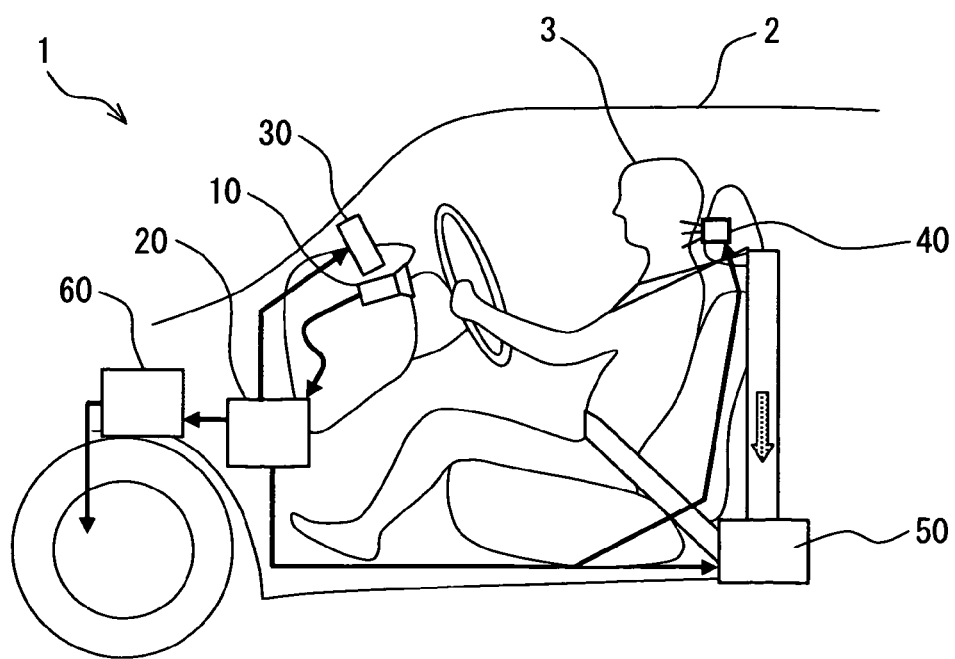
FIG. 2 is a diagram illustrating a side view of an exemplary sleep prevention system.

A sleep prevention system 1, in accordance with a first embodiment, includes an entire structure that is mounted to a vehicle 2. As shown in FIG. 2, the sleep prevention system 1 includes an imaging device 10 for capturing a facial image of a driver 3; a sleepiness determination device 20 for determining a degree of sleepiness in accordance with the facial image; and multiple devices such as a warning device 30, a neck air conditioner 40, a seatbelt vibrator 50, and a brake controller 60, for preventing accidents caused by sleep driving in accordance with a degree of the determined sleepiness.

The imaging device 10 is disposed facing the front of the driver 3 in the vehicle 2 to take facial images of the front of the driver 3 at predetermined intervals such as for example, 1/30 s.

Figure 3:
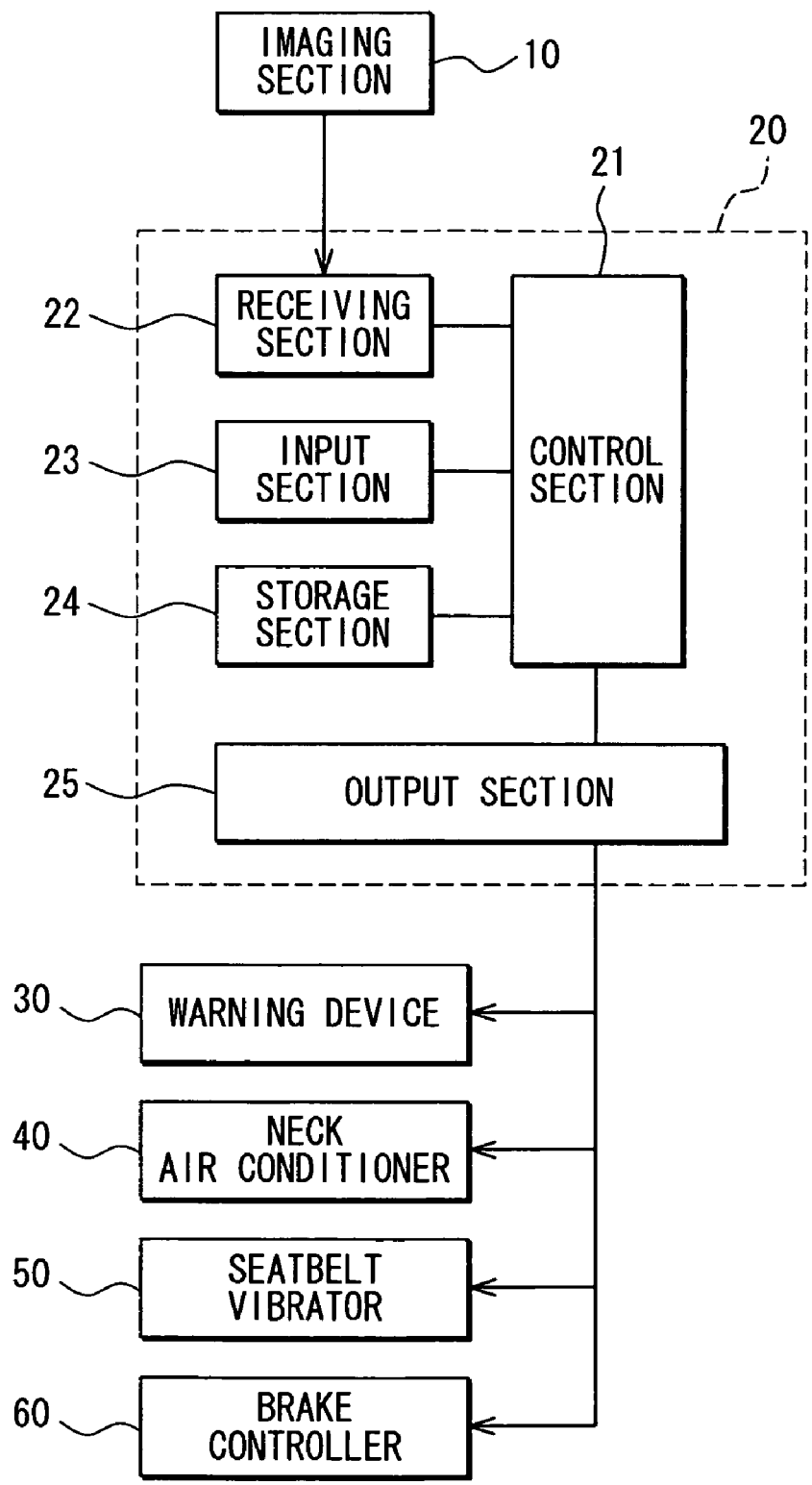
FIG. 3 is a block diagram illustrating a sleepiness determination device.

As shown in FIG. 3, the sleepiness determination device 20 includes a control section 21, a receiving section 22, an input section 23, a storage section 24, and an output section 25. The control section 21 of the sleepiness determination device 20 controls the sleepiness determination device 20 entirely in accordance with a program stored in the storage section 24. It will be appreciated therefore that control section 21 can be a processor, including a general purpose processor, special purpose or custom processor, application specific integrated circuit (ASIC), logic array, or the like. Each time the control section 21 receives image data showing a facial image captured by the imaging device 10, the control section 21 stores the image data into a memory that is built in the control section 21, which can be referred to hereinafter as a built-in memory. With regard to the image data, the control section main process, wakefulness data collection process, drive data collection process, facial expression information obtaining process, and sleepiness determination process are performed. It should be noted that in accordance with the sleepiness determination processes as described herein, a degree of sleepiness can be determined as: a sleepiness level 0 corresponding to no sleepiness, a sleepiness level 1 corresponding to slight sleepiness, a sleepiness level 2 corresponding to moderate sleepiness, and a sleepiness level 3 corresponding to strong sleepiness.

As noted above, the sleepiness determination device 20 includes various sections, details of which are now described. The input section 23 includes a start button for starting the after-mentioned control section main process and a termination button for terminating all processes and operations of the sleep prevention system 1. The storage section 24 includes a storage region for programs controlling the control section 21 and a storage region for storing after-mentioned various data as storage regions for storing data. The output section 25 outputs a signal for executing sleep prevention measures to the warning device 30. Sleep prevention measures can include activation of one or a combination of the neck air conditioner 40, the seatbelt vibrator 50, and the brake controller 60 in accordance with a degree of sleepiness determined by the control section 21.

It should be noted that the warning device 30 includes a display and a speaker and can output visible and audible warnings to the driver 3. For example, the warning device 30 can output an audible warning to "take a rest soon" for example in case of the sleepiness level 1, "be careful" in case of the sleepiness level 2, and "stop driving" in case of the sleepiness level 3, and can output the content to the display as a voice signal via the speaker or as a voice and visual display or the like. The neck air conditioner 40 can be disposed in a headrest of a driver seat to send air to the neck of the driver 3 when one of the sleepiness levels 1 to 3 are determined to exist. The seatbelt vibrator 50 is can be coupled to a seatbelt retraction mechanism so as to vibrate the seatbelt when the driver 3 is determined to be in one of the sleepiness levels 2 or 3. Still further, the brake controller 60 automatically operates brakes to stop a vehicle forcibly and to gradually decelerate the vehicle when sleepiness is determined by the control section 21 to be at the sleepiness level 3.

Figure 4:
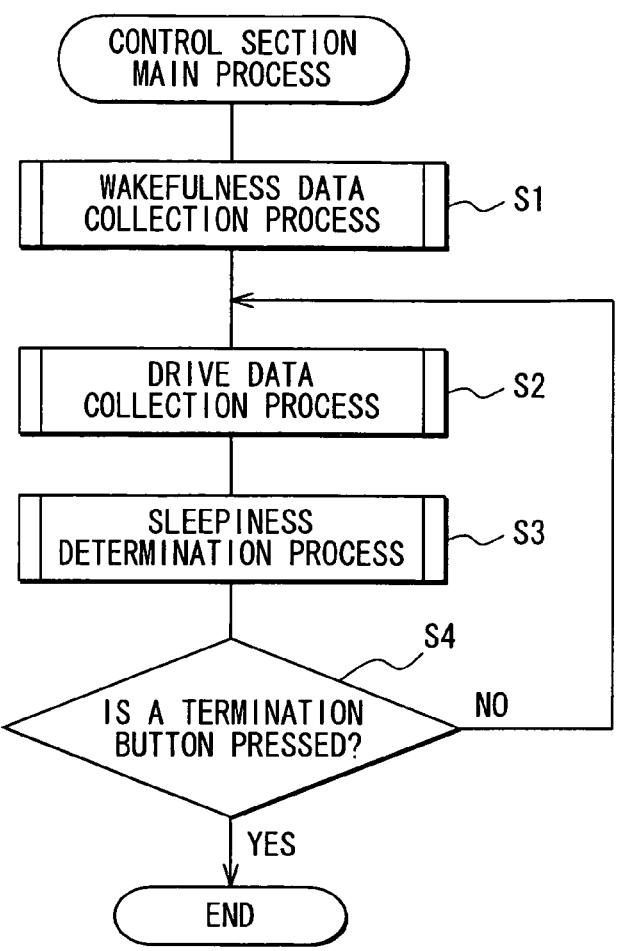
FIG. 4 is a flowchart illustrating an exemplary procedure of a control section main process in accordance with a first embodiment.

An exemplary procedure of the main process by the control section 21 is now explained with reference to FIG. 4. The control section main process can be started by pressing a start button provided to the input section 23. When the control section main process begins operation, a wakefulness data collection process, to be described in greater detail hereinafter, is performed at S1 in which information about a face of the driver 3 during wakefulness is collected. Facial features such as $L1b$, $L2b$, $\alpha b$, and $\theta b$ are collected forming the information about the face during wakefulness. The above described information forms the standard criteria, such as reference criteria for determining sleepiness of the driver 3. L1 refers to information about a distance between left and right corners of a mouth. L2 refers to information about a distance between an eyebrow and eye. The symbol "$\alpha$" refers to information about a front to back or tilt angle of a head. The symbol "$\theta$" refers to information about a left and right tilt angle of the head.

A drive data collection process is performed at S2 for collecting information about the face of the driver 3 after driving has commenced, where information such as $L1d$, $L2d$, $\alpha d$, and $\theta d$ associated with the face of the driver 3 can be collected. The drive data collection process is explained later in greater detail.

A sleepiness determination process is performed at S3 for determining a degree of sleepiness of the driver 3. First, by comparing $L1b$, $L2b$, $\alpha b$, and $\theta b$ collected at S1 and $L1d$, $L2d$, $\alpha d$, and $\theta d$ collected at S2 to each other, sleepiness is determined in accordance with the known sleepiness indication characteristics of L1, L2, $\alpha$, and $\theta$.

In accordance with various combinations of the determination results, a degree of sleepiness can determined and classified as one of the four sleepiness levels previously described such as level 0, level 1, level 2, and level 3. The sleepiness determination process is explained later in greater detail.

At S4, it can be determined whether the termination button of the input section 23 is depressed. If the termination button is not depressed, corresponding to NO at S4, the process returns to S2. When the termination button is pressed, corresponding to YES at S4, the process terminates. The control section main process also can be terminated when the driving section such as the engine in the vehicle 2 stops and control of the vehicle terminates entirely.

Figure 5:
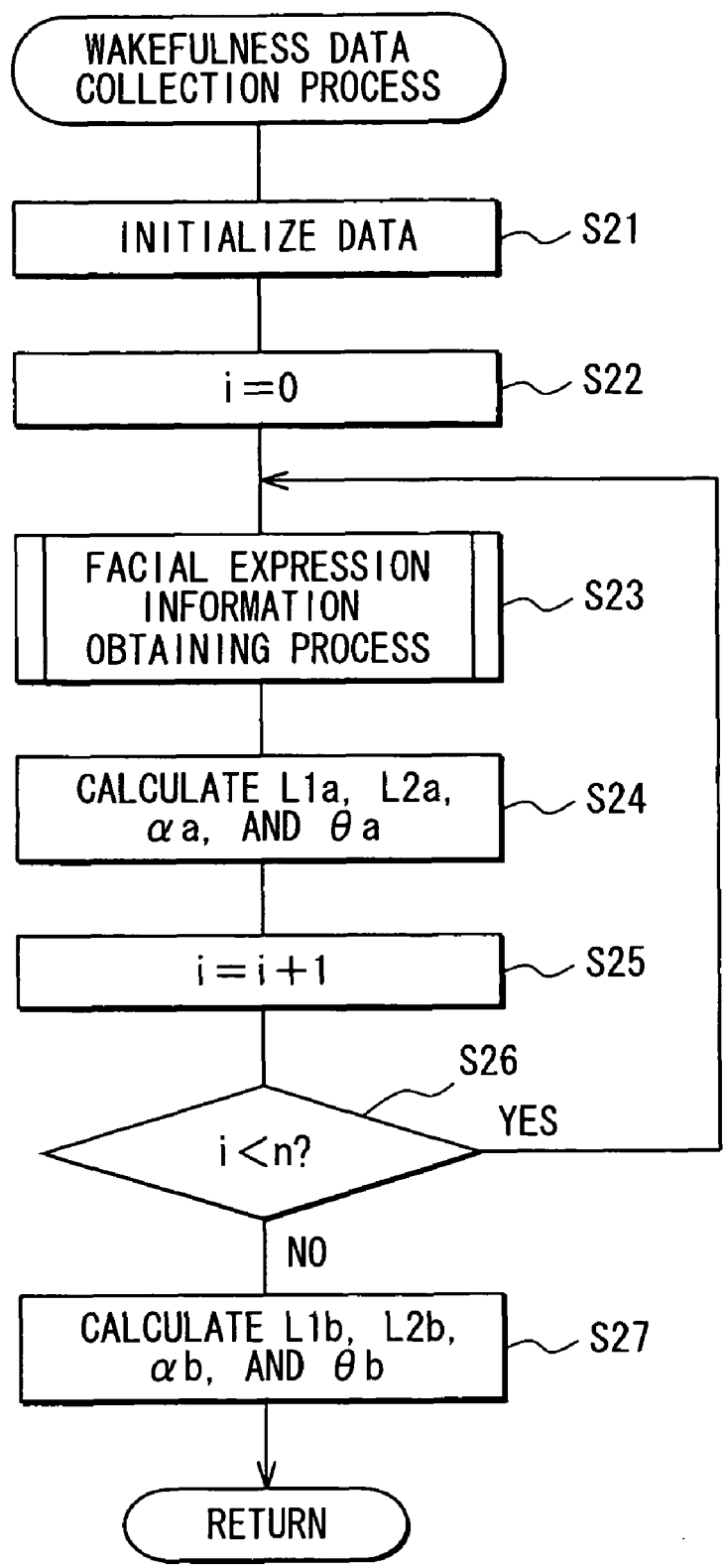
FIG. 5 is a flowchart illustrating an exemplary procedure of a wakefulness data collection process in accordance with a first embodiment.

An exemplary procedure of the wakefulness data collection process by the control section 21 will now be explained below with reference to FIG. 5. The wakefulness data collection process can be performed at S1 of the control section main process.

In the wakefulness data collection process, data is first initialized at S21, where image data stored in the built-in memory of the control section 21 and various data stored in the storage section 24 are deleted. An index variable i can be set to zero at S22. The facial expression information obtaining process is performed for detecting information about the face of the driver 3 at S23, where, in accordance with facial image data captured by the imaging device 10, L1, L2, $\alpha$, and $\theta$ are collected at predetermined times forming m times, and then stored in the storage section 24, where the number of each of L1, L2, $\alpha$, and $\theta$ is m.

L1 is a distance between left and right corners of a mouth. It has become known through various evolutions of experimentation as described herein, that L1 is reduced when the periphery of the mouth relaxes due to sleepiness. L2 is a distance between the midpoint between an inner corner of a left eye and an outer corner of the left eye and the midpoint of a left eyebrow can be referred to herein as simply a distance between an eyebrow and eye. It has become known through experimentation as described herein, that the distance L2 increases when sleepiness occurs. The value a is an angle showing a back and forth tilt of a head. The e is an angle showing a left and right tilt of a head. The facial expression information obtaining process is explained below in detail.

In accordance with L1, L2, $\alpha$, and $\theta$, the number of each of which is m, the representative values of $L1a$, $L2a$, $\alpha a$, and ea are calculated at S24. First, L1, L2, $\alpha$, and e, which are stored in the storage section 24, are all read. In accordance with the frequency distribution of collected values of L1, L2, $\alpha$, and $\theta$, a value corresponding to five percent of the cumulative relative frequency from the minimum value of L1, which decreases as sleepiness increases, is calculated as $L1a$. Thus, as will be appreciated by one of ordinary skill, the value calculated for $L1a$ will be the value which ninety five percent of the cumulative values for L1 are above. On the other hand, values corresponding to five percent of the cumulative relative frequencies from the maximum values of L2, α, and θ, which increase as sleepiness increases, are calculated as L2a, αa, and θa. Thus, as will be appreciated by one of ordinary skill, the values calculated for L2a, αa, and θa will be the respective values which ninety five percent of the corresponding cumulative values for L2, α, and θ are below.

The calculated L1a, L2a, αa, and ea are stored in the storage section 24, and L1, L2, α, and θ stored in the storage section 24 are deleted. Multiple values of each of L1a, L2a, αa, and θa can be stored in the storage section 24. Each time L1a, L2a, αa, and θa are calculated at S24, the number of values of L1a, L2a, αa, and θa stored in the storage section 24 increase in number respectively.

After that, the variable i is incremented (i=i+1) at S25, and the process returns to S23 if the variable i is less than a predetermined value n, corresponding to a YES at S26. On the other hand, when the variable i is not less than the predetermined value n corresponding to a NO at S26, the process proceeds to S27. It should be noted that n values of each of L1a, L2a, αa, and θa are then stored in the storage section 24. Next, the values L1b, L2b, αb, and θb, which can be used in the after-mentioned sleepiness determination process, are calculated at S27.

At S27, the values L1a, L2a, αa, and θa that are stored in the storage section 24 are all read, and their normal distributions are produced. When a mean value in each normal distribution is μ, and a standard deviation in each normal distribution is σ, a value corresponding to μ−2σ is calculated as L1b from the normal distribution of L1a corresponding to L1, which decreases as sleepiness increases. On the other hand, values corresponding to μ+2σ are calculated as L2b, αb, and θb from the normal distributions of L2a, αa, and ea corresponding to L2, α, and θ, which increase as sleepiness increases. The calculated L1b, L2b, αb, and θb are stored in the storage section 24, and L1a, L2a, αa, and θa stored in the storage section 24 are deleted. After that, the process terminates, and returns to the control section main process.

Figure 6:
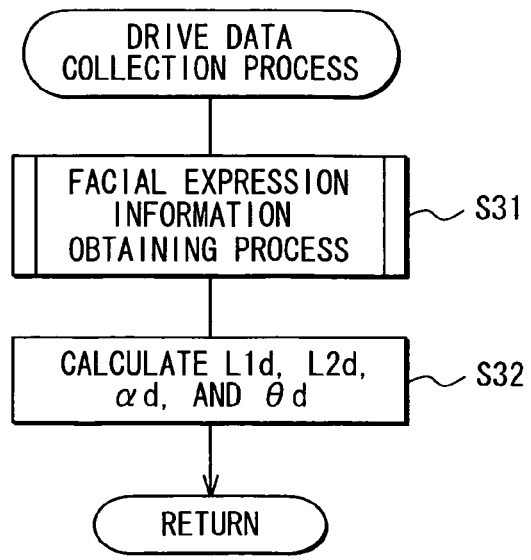
FIG. 6 is a flowchart illustrating an exemplary procedure of a drive data collection process in accordance with a first embodiment.

A procedure of the drive data collection process by the control section 21 will now be explained with reference to FIG. 6. The drive data collection process is executed at S2 of the control section main process. In accordance with the drive data collection process, a facial expression information obtaining process is first performed for detecting information about a face of the driver 3 at S31. At S23 of the wakefulness data collection process, m values of each of L1, L2, α, and θ are obtained. The facial expression information obtaining process is explained later in greater detail.

In accordance with the values of L1, L2, α, and θ collected, obtained or calculated at S31, the representative values of L1d, L2d, αd, and θd are calculated at S32. First, L1, L2, α, and θ stored in the storage section 24 are all read. In accordance with the frequency distribution of collected values of L1, L2, α, and θ, a value corresponding to five percent of the cumulative relative frequency from the minimum value of L1, which decreases as sleepiness increases, is calculated as L1d. Thus, as will be appreciated by one of ordinary skill, the value calculated for L1d will be the value which ninety five percent of the cumulative values for L1 are above. On the other hand, values corresponding to five percent of the cumulative relative frequencies from the maximum values of L2, α, and θ, which increase as sleepiness increases, are calculated as L2d, αd, and θd. Thus, as will be appreciated by one of ordinary skill, the values calculated for L2d, αd, and θd will be the respective values which ninety five percent of the corresponding cumulative values for L2, α, and θ are below. The calculated values of L1d, L2d, αd, and θd are stored in the storage section 24, and L1, L2, α, and θ stored in the storage section 24 are deleted. The process then terminates, and execution returns to the control section main process.

A procedure of the facial expression information obtaining process by the control section 21 will now be explained with reference to FIG. 7. The facial expression information process is performed at S23 of the wakefulness data collection process and at S31 of the drive data collection process. In the facial expression information process, a variable j is first set to zero at S41. Image data showing a facial image captured by the imaging device 10 is obtained from the receiving section 22 at S42. In accordance with the image data obtained at S42, positional, angular information about positions and angles of components of the face is detected at S43.

Figure 8:
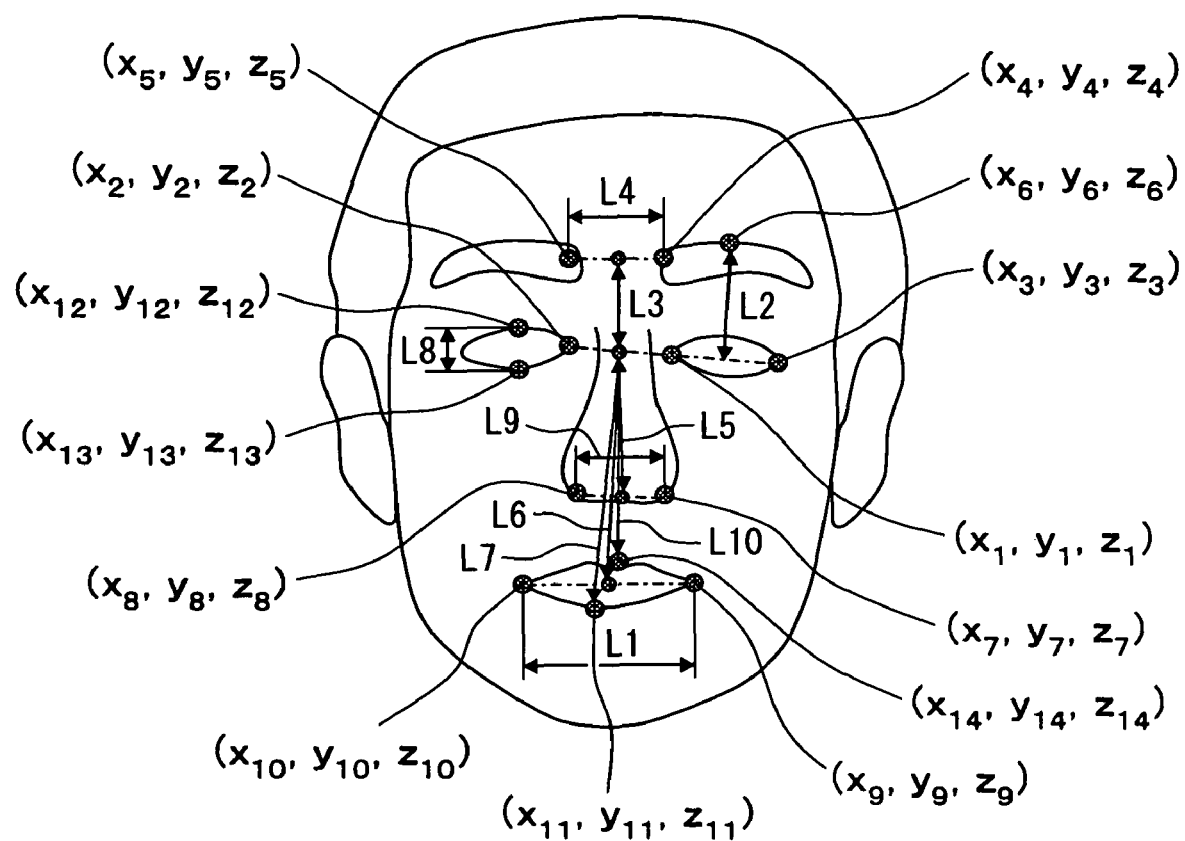
FIG. 8 is a diagram illustrating exemplary locations of facial feature points.

As shown in FIG. 8, positions of face feature points of an inner corner of a left eye $(x_1, y_1, z_1)$, an inner corner of a right eye $(x_2, y_2, z_2)$, an outer corner of a left eye $(x_3, y_3, z_3)$, an inner corner of a left eyebrow $(x_4, y_4, z_4)$, an inner corner of a right eyebrow $(x_5, y_5, z_5)$, an upper edge of a midpoint of a left eyebrow $(x_6, y_6, z_6)$, an outer corner of a left nasal opening (corner disposed oppositely to a right nasal opening) $(x_7, y_7, z_7)$, a an outer corner of a right nasal opening (corner disposed oppositely to a left nasal opening) $(x_8, y_8, z_8)$, a left corner of a mouth $(x_9, y_9, z_9)$, a right corner of a mouth $(x_{10}, y_{10}, z_{10})$, a lower edge of a lower lip $(x_{11}, y_{11}, z_{11})$, an upper lid $(x_{12}, y_{12}, z_{12})$, a lower lid $(x_{13}, y_{13}, z_{13})$, and an upper edge of an upper lip $(x_{14}, y_{14}, z_{14})$, and information a about a back and forth tilt angle of a head and information θ about a left and right tilt angle of a head, are detected. It should be noted that the values of α and θ are detected as positive values when a head tilts in any of the back, forth, left, and right directions.

The above positional, angular information is detected from the facial image data. In consideration of practical usage, the process is enabled using images captured by a single camera. Then, face feature points are detected from the images, and distances between the feature points are detected.

Figure 9:
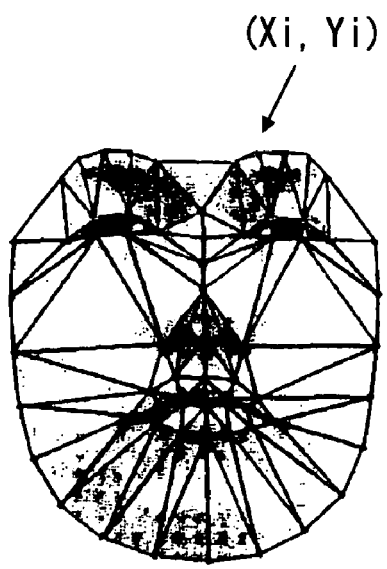
FIG. 9 is a diagram illustrating a 2D model and 3D model of an active appearance model (AAM)
Figure 9:
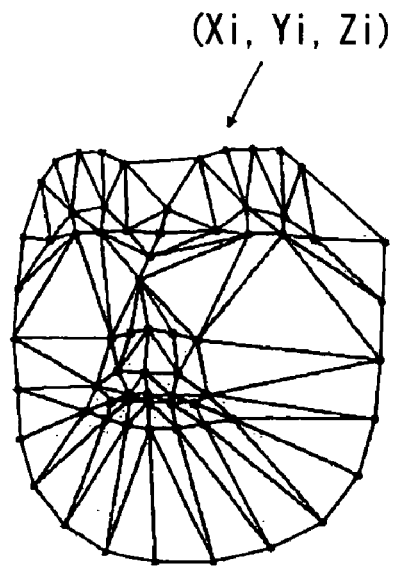

The detection of the face feature points is usually performed using shape extraction and pattern matching to detect two-dimensional coordinates on the images. In the embodiment, since distances between the feature points need to be detected precisely even when a direction of the face changes, the face feature points are detected as three-dimensional coordinates. More specifically, by use of and active appearance model (MM), three-dimensional coordinates of feature points are detected from facial images captured by a single camera. Then, distances between feature points, the distances being amounts of features, are calculated from the coordinates. The MM is a method for detecting three-dimensional coordinates of feature points and tilt angles of a head by fitting, to the images, a two-dimensional model, for example, as shown in FIG. 9A, having information about a shape and texture formed from many feature points and a three-dimensional model formed from only a shape, for example, as shown in FIG. 9B.

Next, in accordance with the detection result at S43, the information L1 corresponding to a distance between left and right corners of a mouth and the information L2 corresponding to a distance between an eyebrow and eye, such as a distance between the midpoint between inner and outer corners of a left eye and an upper edge of a left eyebrow, are calculated respectively using Equation 1 and Equation 2, listed below, and stored in the storage section 24 together with α and θ detected at S43 at S44.

$$L1=[(x_9-x_{10})^2+(y_9-y_{10})^2+(z_9-z_{10})^2]^{0.5} \qquad (1)$$

$$L2 = [(x_6-(x_1+x_3)/2)^2 + (y_6-(y_1+y_3)/2)^2 + (z_6-(z_1+z_3)/2)^2]^{0.5} \quad (2)$$

Values of the calculated L1, L2, and of α and θ detected at S43 are stored in the storage section 24. Multiple values of the above information can be stored in the storage section 24. Each time L1, L2 are calculated at S44, the number of values of each of L1, L2, and α and θ stored in the storage section 24 increases by one.

After S44, the variable j is incremented (j=j+1) at S45, and when the variable j is less than a predetermined value m, corresponding to YES at S46, the process returns to S42. On the other hand, when the variable j is not less than the predetermined value m, corresponding to NO at S46, the process terminates.

Figure 10:
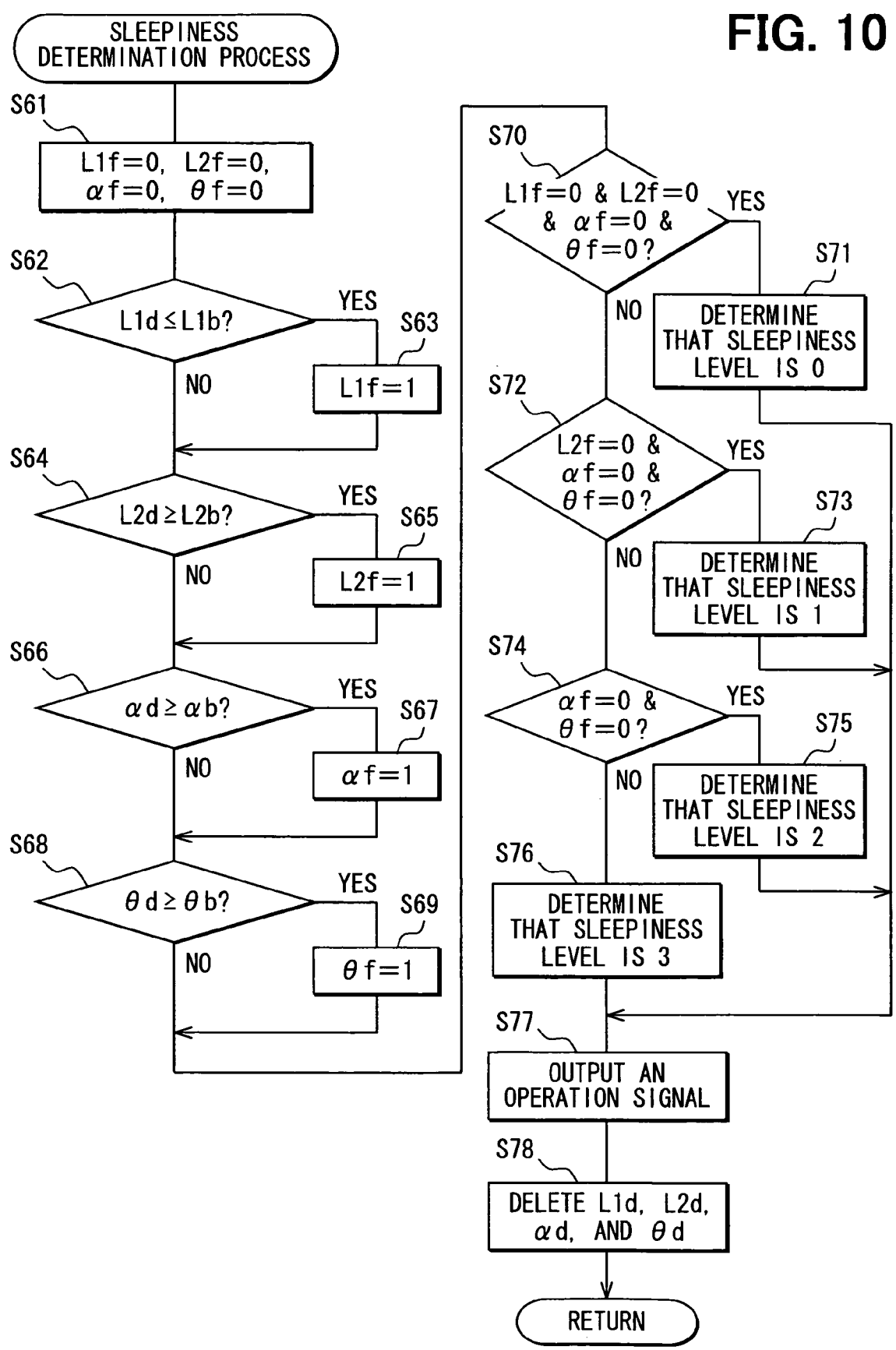
FIG. 10 is a flowchart illustrating an exemplary procedure of a sleepiness determination process in accordance with a first embodiment.

A procedure of the sleepiness determination process by the control section 21 will now be explained with reference to FIG. 10. The sleepiness determination process is performed at S3 of the control section main process. Variables L1f, L2f, αf, and θf are first set to zero at S61.

Next, a value of L1b calculated at S27 of the wakefulness data collection process and a value of L1d calculated at S32 of the drive data collection process are compared to each other at S62. When the value of L1d is less than or equal to the value of L1b corresponding to YES at S62, namely when a distance between left and right corners of a mouth is shorter than that in case of wakefulness, the variable L1f is set to 1 at S63, and the process proceeds to S64. On the other hand, when the value of L1d is not the less than or equal to the value of L1b corresponding to NO at S62, the process proceeds to S64.

A value of L2b calculated at S27 of the wakefulness data collection process and a value of L2d calculated at S32 of the drive data collection process are compared to each other at S64. When the value of L2d is greater than or equal to the value of L2b corresponding to YES at S64, namely when a distance between an eyebrow and eye is longer than that in case of wakefulness, the variable L2f is set to 1 at S65, and the process proceeds to S66. On the other hand, when the value of L2d is not greater than or equal to the value of L2b corresponding to NO at S64, the process proceeds to S66.

A value of αb calculated at S27 of the wakefulness data collection process and a value of αd calculated at S32 of the drive data collection process are compared to each other at S66. When the value of αb is greater than or equal to the value of αd corresponding to YES at S66, namely when a back and forth tilt of a head is larger than that in case of wakefulness, the variable αf is set to 1 at S67, and the process proceeds to S68. On the other hand, when the value of αb is not greater than or equal to the value of αd corresponding to NO at S66, the process proceeds to S68 without changing the variable αf.

A value of θb calculated at S27 of the wakefulness data collection process and a value of θd calculated at S32 of the drive data collection process are compared to each other at S68. When the value of Ed is greater than or equal to the value of θb corresponding to YES at S68, namely when a left and right tilt of a head is larger than that in case of wakefulness, the variable θf is set to 1 at S69, and the process proceeds to S70. On the other hand, when the value of θd is not greater than or equal to the value of θb corresponding to NO at S68, the process proceeds to S70 without changing the variable θf.

When the variables L1f, L2f, αf, and θf are all zero corresponding to a YES at S70, sleepiness is determined to be at a sleepiness level 0 at S71, and the process proceeds to S77. On the other hand, when not all of the variables L1f, L2f, αf, and θf are zero corresponding to NO at S70, the process proceeds to S72.

When the variables L2f, αf, and θf are all zero corresponding to YES at S72, sleepiness is determined to be at a sleepiness level 1 at S73, and the process proceeds to S77. On the other hand, when not all of the variables L2f, αf, and θf are zero corresponding to NO at S72, the process proceeds to S74.

When the variables αf and θf are all zero corresponding to YES at S74, sleepiness is determined to be at a sleepiness level 2 at S75, and the process proceeds to S77. On the other hand, when not all of the variables αf and θf are zero corresponding to NO at S74, sleepiness is determined to be at a sleepiness level 3 at S76.

Next, in accordance with the determined sleepiness degree, the output section 25 outputs signals for operating the warning device 30, neck air conditioner 40, seatbelt vibrator 50, and brake controller 60 at S77. When sleepiness is determined to be at a sleepiness level 0, none of the above devices are operated. When sleepiness is determined to be at a sleepiness level 1, the warning device 30 and neck air conditioner 40 are operated. When sleepiness is determined to be at a sleepiness level 2, the warning device 30, neck air conditioner 40, and seatbelt vibrator 50 are operated. When sleepiness is determined to be at a sleepiness level 3, all the devices are operated. The values of L1d, L2d, αd, and θd are deleted from the storage section 24 at S78 and the process terminates, and execution returns to the control section main process.

In the sleepiness determination device 20 in the first embodiment structured as described above, a level of sleepiness can be determined in accordance with a distance between left and right corners of a mouth, a distance between a eyebrow and eye, and tilt angles of a head. Accordingly, the determination of a sleepiness degree requires no information about an opening of an eye. Accordingly, a sleepiness degree can be determined even in the case where a degree of sleepiness cannot be determined from eye information such as an eye opening, pupil diameter, and line of sight based on for example, a disturbance that interrupts the acquisition of eye information.

Additionally, in the sleepiness determination device 20, a sleepiness level can be determined from image data showing facial images captured by the imaging device 10. A sleepiness level can be determined easily from image feature analysis without the need for attaching an electrode for detecting a distance between left and right corners of a mouth, a distance between a eyebrow and eye, and a head tilt angle to a target person whose sleepiness is to be determined.

Further, since a distance between left and right corners of a mouth changes in case of slight sleepiness, a distance between an eyebrow and eye changes in case of moderate sleepiness, and a head tilt angle changes in case of strong sleepiness, the sleepiness determination device 20 can determine a sleepiness degree through such a method as, for example, four levels: strong sleepiness; moderate sleepiness; slight sleepiness; and no sleepiness. The sleep prevention system 1 structured as described above can be used in the vehicle 2, so that a sleepiness degree of the driver 3 of the vehicle 2 can be determined and preventive measures can be taken if necessary as further described herein.

Additionally, in the above sleep prevention system 1, the sleepiness determination device 20 operates in cooperation with the warning device 30, and a screen display is activated and sound is outputted in accordance with a determined sleepiness degree. Further, the neck air conditioner 40, seatbelt vibrator 50, and brake controller 60 can be operated based on the value of the determined sleepiness degree. Accordingly, the driver 3 can be prevented from sleeping in accordance with a sleepiness degree of the driver 3, and thus an accident due to sleep driving can be prevented.

In the above embodiment, S43 and S44 correspond to procedures that can be carried out, for example, in facial expression information obtaining means. The sleepiness determination process of FIG. 10 can be carried out, for example, by sleepiness determination means in accordance with the present invention. The imaging device 10 can correspond, for example, to imaging means in accordance with the present invention.

Second Embodiment

The sleep prevention system 1 in accordance with a second embodiment can be basically the same structure as in the first embodiment. However, since the procedure carried out by the control section 21 is partially changed, the second embodiment will be discussed herein below primarily with reference to the changed part. Processes executed by the control section 21 provided to the sleepiness determination device 20 of the sleep prevention system 1 in accordance with a second embodiment are explained below.

In accordance with a second embodiment, procedures of the control section main process, wakefulness data collection process, drive data collection process, and sleepiness determination process are different from those in accordance with a first embodiment.

Figure 11:
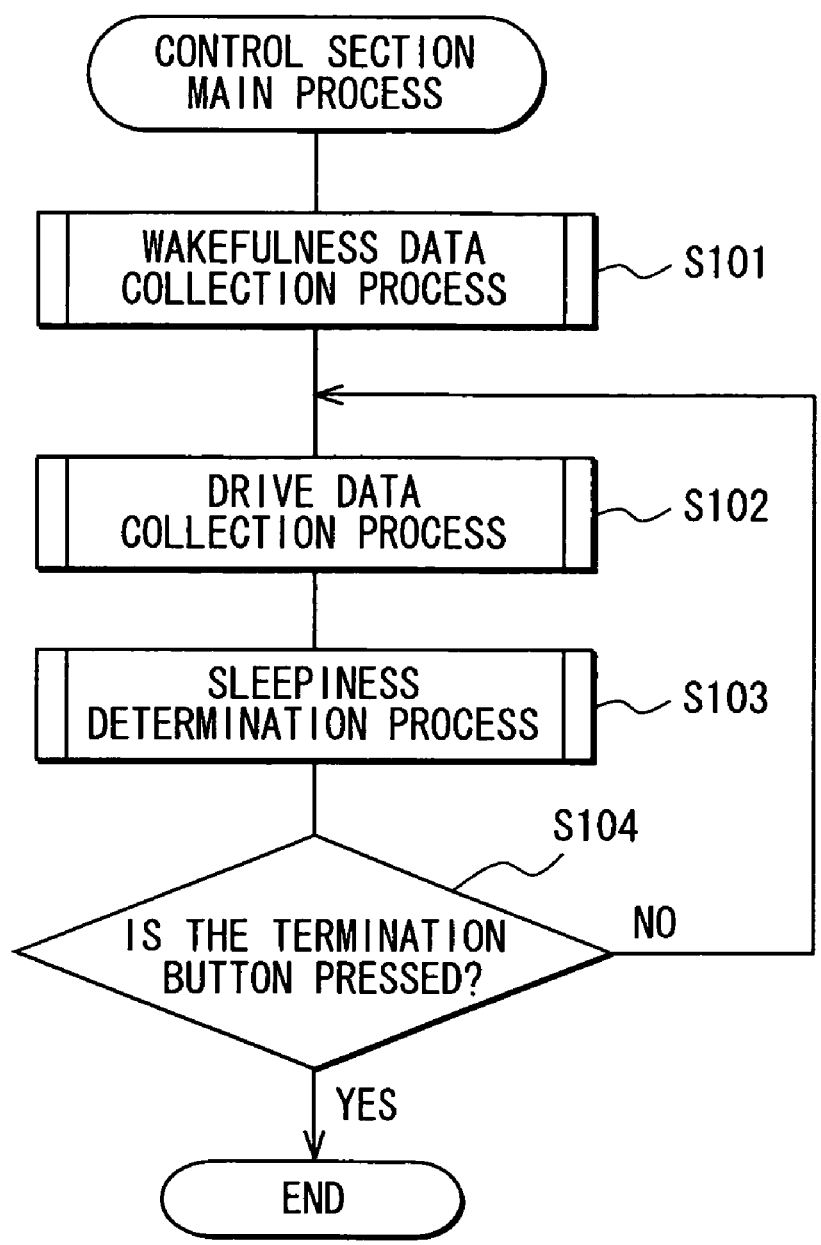
FIG. 11 is a flowchart illustrating an exemplary procedure of the control section main process in accordance with a second embodiment.

A procedure of the control section main process in accordance with a second embodiment is explained below in reference to FIG. 11. The control section main process is started by pressing the start button provided to the input section 23.

First, in the control section main process, a wakefulness data collection process for collecting information about the face of the driver 3 during wakefulness is performed at S101. Information about a face during wakefulness, which is constitutes a standard for determining sleepiness of the driver 3, is obtained including n values of each of the quantities $L1a$, $L2a$, $\alpha a$, and $\theta a$ as will be explained in greater detail hereinafter.

The drive data collection process for obtaining information about the face of the driver 3 is performed at S102. Information about the face of the driver 3, including n values of each of the quantities $L1d$, $L2d$, $\alpha d$, and $\theta d$ are obtained as will be explained in greater detail hereinafter.

The sleepiness determination process is performed at S103 for determining a sleepiness level of the driver 3. In S103, in accordance with n values of each of $L1a$, $L2a$, $\alpha a$, and $\theta a$ calculated at S101 and n values of each of $L1d$, $L2d$, $\alpha d$, and $\theta d$ calculated at S102, paired t-tests are performed. In accordance with the test results, it can be determined whether sleepiness occurs based on the information L1 about a distance between left and right corners of a mouth, information L2 about a distance between an eyebrow and eye, information $\alpha$ about a back and forth tilt angle, and information $\theta$ about a left and right tilt angle of a head. From combinations of the determination results, a degree of sleepiness is determined. The sleepiness determination process in accordance with a second embodiment is explained in greater detail hereinafter.

It can be checked whether the termination button of the input section 23 is pressed at S104. When the termination button of the input section 23 is not pressed corresponding to NO at S104, the process returns to S102. On the other hand, when the termination button of the input section 23 is pressed corresponding to YES at S104, the process terminates. It should be noted that the control section main process also terminates when the driving section such as the engine of the vehicle 2 stops and the control of the vehicle terminates entirely.

Figure 12:
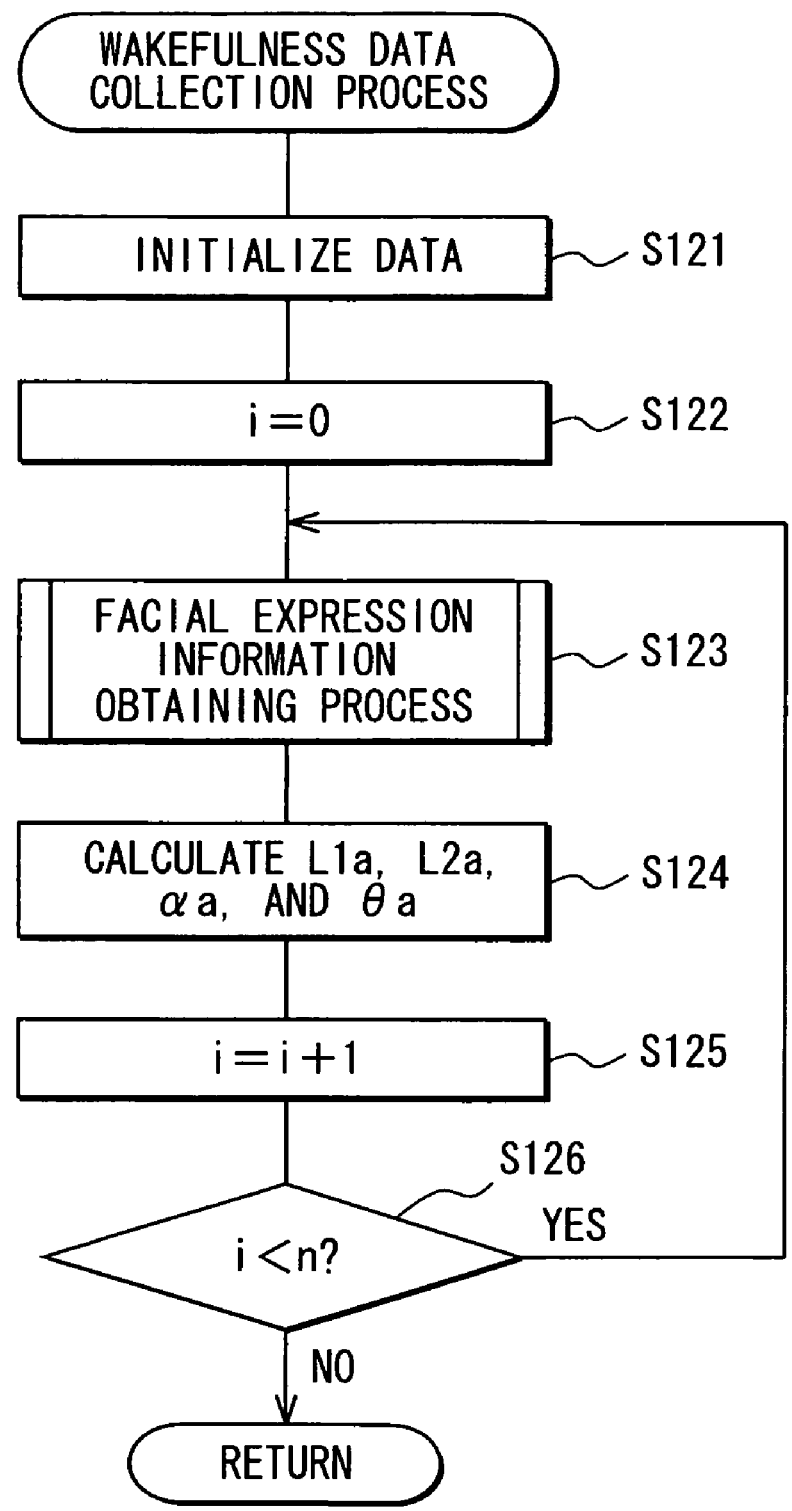
FIG. 12 is a flowchart illustrating an exemplary procedure of the wakefulness data collection process in accordance with a second embodiment.

In the wakefulness data collection process, explained herein below with reference to FIG. 12, S121 to S126 are the same as S21 to S26 in the wakefulness data collection process in accordance with a first embodiment. When a variable i is not less than a predetermined value n corresponding to NO at S126, the process terminates without executing the process corresponding to S27 of the wakefulness data collection process of a first embodiment, and execution returns to the control section main process.

In accordance with a first embodiment, at the time of termination of the wakefulness data collection process, $L1b$, $L2b$, $\alpha b$, and $\theta b$ are stored in the storage section 24. In accordance with a second embodiment, at the time of termination of the wakefulness data collection process, n values of each of $L1a$, $L2a$, $\alpha a$, and $\theta a$ are stored in storage section 24.

Figure 13:
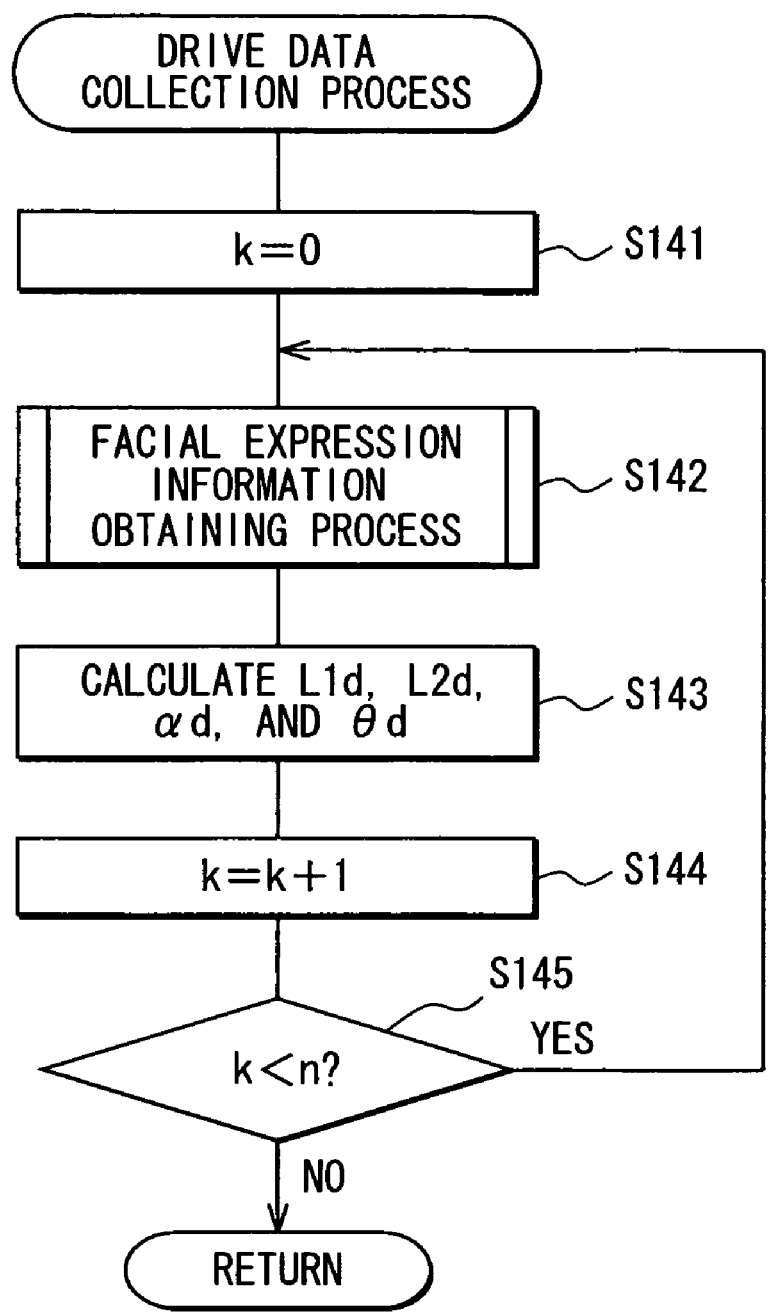
FIG. 13 is a flowchart illustrating an exemplary procedure of the drive data collection process in accordance with a second embodiment.

A procedure of the drive data collection process in accordance with a second embodiment is explained herein below with reference to FIG. 13. The drive data collection process is performed at S102 of the control section main process. In the drive data collection process, first, a variable k is set to zero at S141.

The facial expression information obtaining process described in accordance with a first embodiment is performed, and m values of each of L1, L2, $\alpha$, and $\theta$ are calculated at S142. In accordance with m values of each of L1, L2, $\alpha$, and $\theta$ calculated at S142, representative values $L1d$, $L2d$, $\alpha d$, and $\theta d$ are calculated at S143. The representative values are calculated through the same process as S32 of the drive data collection process of a first embodiment. The calculated values of each of $L1d$, $L2d$, $\alpha d$, and $\theta d$ are stored in the storage section 24 where multiple values of each of $L1d$, $L2d$, $\alpha d$, and $\theta d$ can be stored. Each time the above values are calculated at S143, the number of each of $L1d$, $L2d$, $\alpha d$, and $\theta d$ is incremented by one. For example, the variable k is incremented (k=k+1) at S144.

When the variable k is less than a predetermined value n corresponding to YES at S145, the process returns to S142. On the other hand, when the variable k is not less than the predetermined value n corresponding to NO at S145, the process terminates, and the execution returns to the control section main process. At the time of termination, n values of each of $L1d$, $L2d$, $\alpha d$, and $\theta d$ are stored in the storage section 24.

A procedure of the sleepiness determination process in accordance with a second embodiment is explained herein below with reference to FIG. 14. The sleepiness determination process is performed at S103 of the control section main process. In the sleepiness determination process, variables $L1f$, $L2f$, $\alpha f$, and $\theta f$ are set to zero at S161.

Next, in accordance with n values of $L1a$ calculated at S124 of the wakefulness data collection process and n values of $L1d$ calculated at S143 of the drive data collection process, a paired t-test is performed at S162. It should be noted that in the sleepiness determination process, a level of significance of the t-test is five percent.

When an average of $L1d$ is significantly smaller than an average of $L1a$ corresponding to YES at S162, namely when a distance between left and right corners of a mouth becomes smaller than that during wakefulness, the variable $L1f$ is set to 1 at S163, and the process proceeds to S164. On the other hand, when an average of $L1d$ is not significantly smaller than an average of $L1a$ corresponding to NO at S162, the process proceeds to S164.

In accordance with n values of L2a calculated at S124 of the wakefulness data collection process and n values of L2d calculated at S143 of the drive data collection process, a paired t-test is performed at S164.

When an average of L2d is significantly larger than an average of L2a corresponding to YES at S164, namely when a distance between an eyebrow and eye becomes larger than that during wakefulness, the variable L2f is set to 1 at S165, and the process proceeds to S166. On the other hand, when an average of L2d is not significantly larger than an average of L2a corresponding to NO at S164, the process proceeds to S166.

Next, in accordance with n values of αa calculated at S124 of the wakefulness data collection process and n values of αd calculated at S143 of the drive data collection process, a paired t-test is performed at S166.

When an average of αd is significantly larger than an average of αa corresponding to YES at S166, namely when a tilt of a head in the back and forth directions becomes larger than that during wakefulness, the variable of is set to 1 at S167, and the process proceeds to S168. On the other hand, when an average of αd is not significantly larger than an average of αa corresponding to NO at S166, the process proceeds to S168 without changing αf.

Next, in accordance with n values of θa calculated at S124 of the wakefulness data collection process and n values of θd calculated at S143 of the drive data collection process, a paired t-test is performed at S168.

When an average of θd is significantly larger than an average of θa corresponding to YES at S168, namely when a tilt of a head in the left and right directions becomes larger than that during wakefulness, the variable θf is set to 1 at S169, the process proceeds to S170. On the other hand, when an average of θd is not significantly larger than an average of θa at corresponding to NO S168, the process proceeds to S170 without changing θf.

When the variables L1f, L2f, αf, and θf are all zero corresponding to YES at S170, sleepiness is determined to be at a sleepiness level 0 at S171, and the process proceeds to S177. On the other hand, not all of the variables L1f, L2f, αf, and θf is zero corresponding to NO at S170, the process proceeds to S172.

When the variables L2f, αf, and θf are all zero corresponding to YES at S172, sleepiness is determined to be at a sleepiness level 1 at S173, and the process proceeds to S177. On the other hand, is not all of the variables L2f, αf, and θf is zero corresponding to NO at S172, the process proceeds to S174.

When the variables αf and θf are all zero corresponding to YES at S174, sleepiness is determined to be at a sleepiness level 2 at S175, and the process proceeds to S177. On the other hand, if not all of the variables αf and θf is zero corresponding to NO at S174, sleepiness is determined to be at a sleepiness level 3 at S176.

In accordance with the determined sleepiness level, the output section 25 outputs a signal for operating the warning device 30, neck air conditioner 40, seatbelt vibrator 50, and brake controller 60 at S177. In the case, the same process as S77 of the sleepiness of a first embodiment is performed. At S178, L1d, L2d, αd, and θd are deleted from the storage section 24 whereupon the process terminates, and the execution returns to the control section main process.

Also in the sleepiness determination device 20 or sleep prevention system 1 in the second embodiment, the same advantage as in the first embodiment can be obtained. In the sleepiness determination process in accordance with a second embodiment, since a paired t-test is performed for determining sleepiness at S170, S172, and S174, the determination results are more reliable. Accordingly, error determinations can be made smaller.

Figure 7:
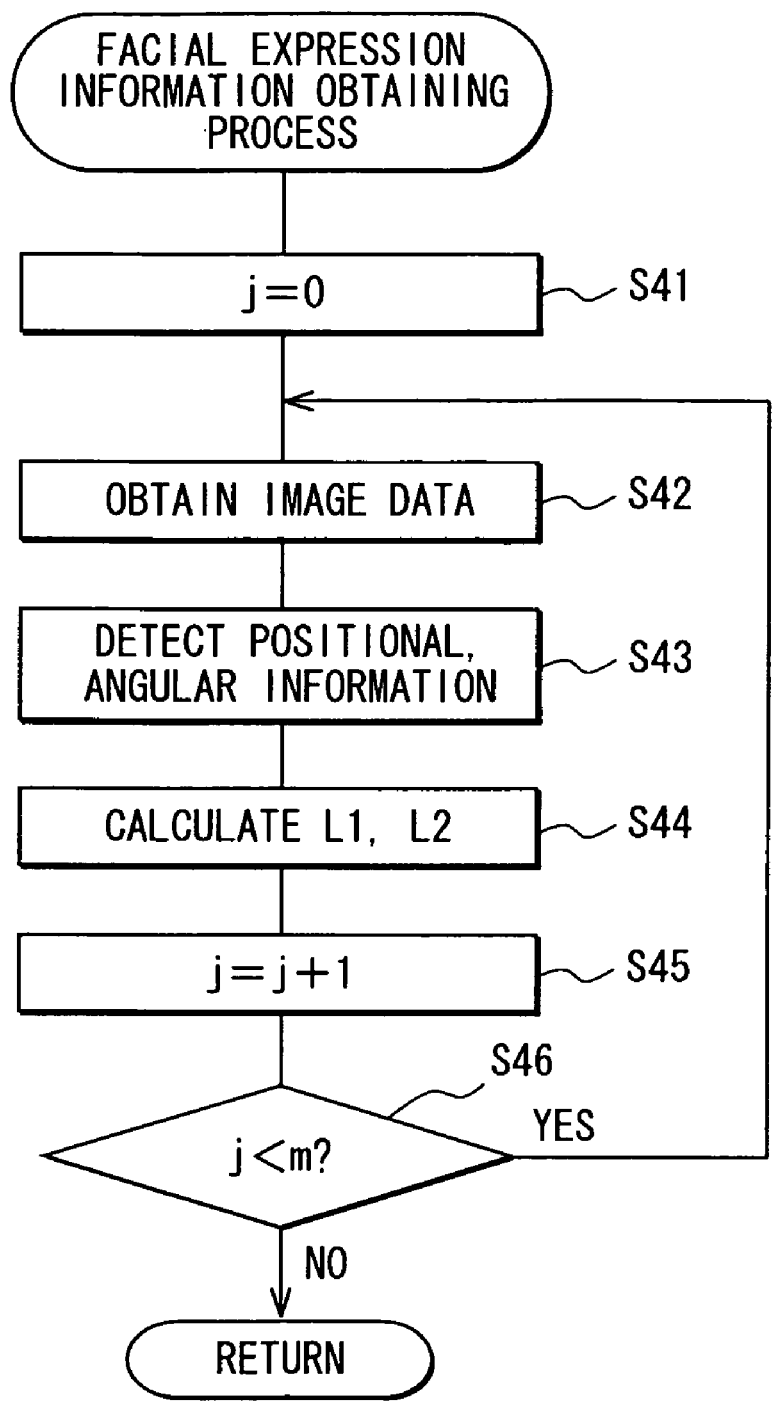
FIG. 7 is a flowchart illustrating an exemplary procedure of a facial expression information obtaining process in accordance with a first embodiment.
Figure 14:
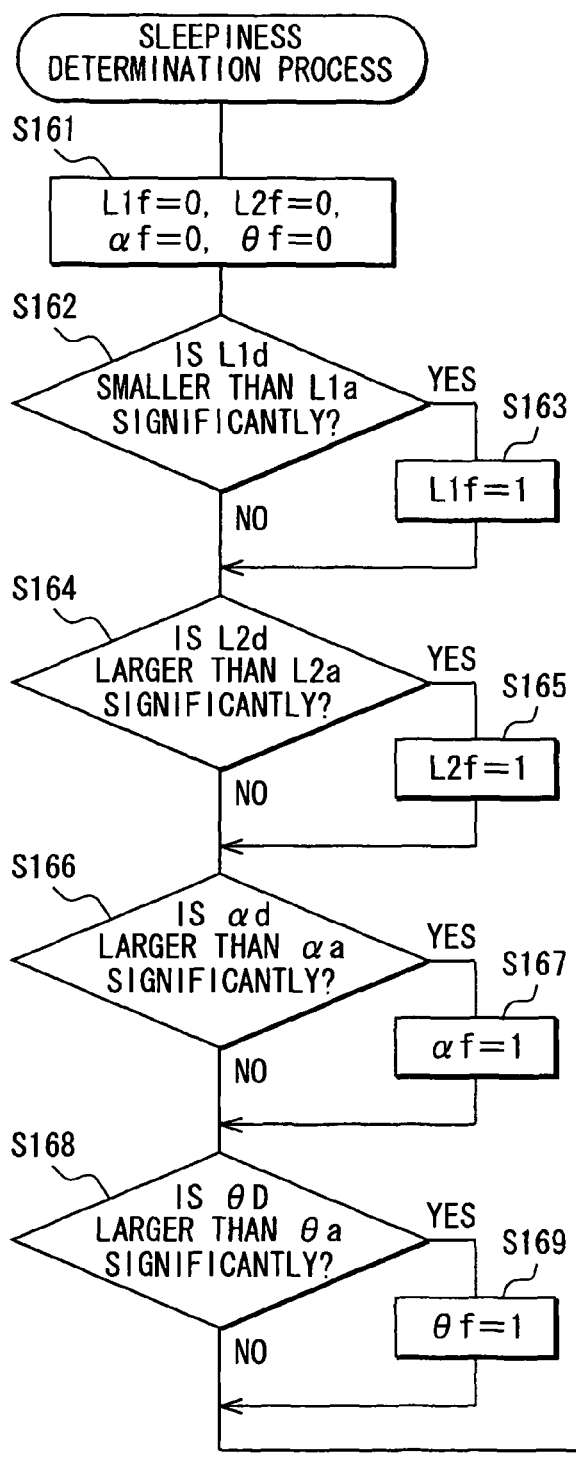
FIG. 14 is a flowchart illustrating an exemplary procedure of the sleepiness determination process in accordance with a second embodiment.
Figure 14:
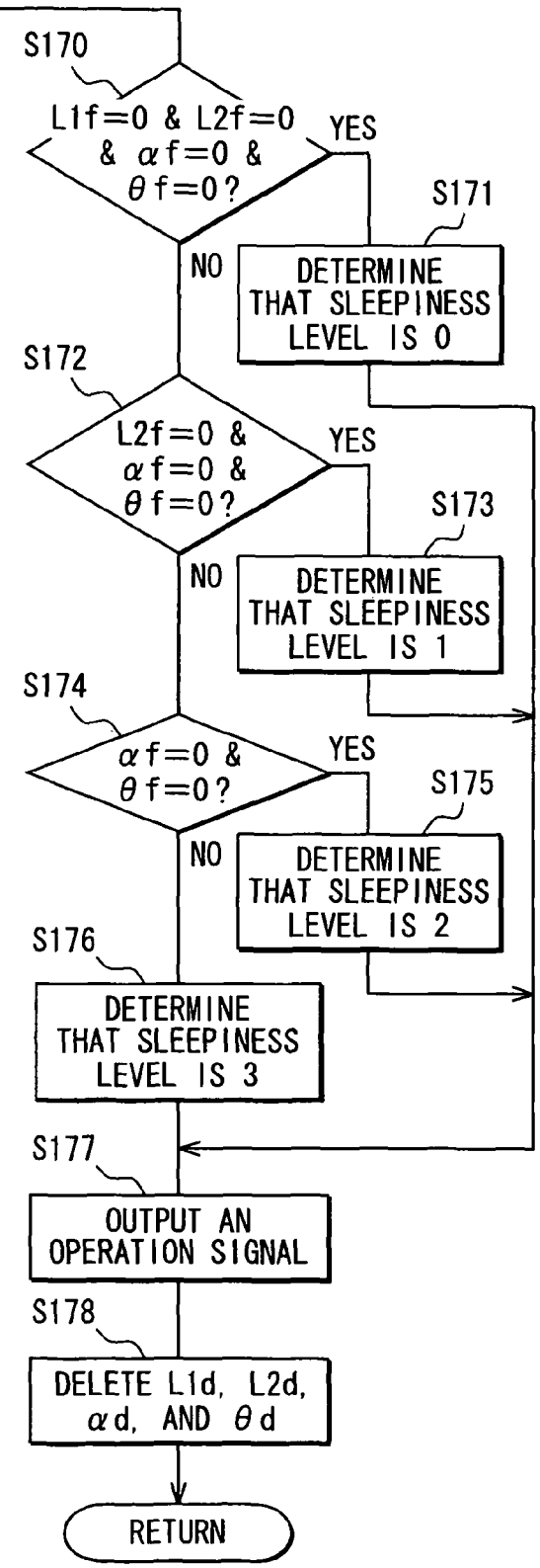

In the present embodiment, S43 and S44 of FIG. 7 correspond to the facial expression information obtaining means, the sleepiness determination process of FIG. 14 corresponds to the sleepiness determination means in accordance with the present invention, and the imaging device 10 corresponds to the imaging means in accordance with the present invention.

Third Embodiment

The sleep prevention system 1 in accordance with a third embodiment has basically the same structure as in a first embodiment. However, since the process by the control section 21 is different from that in a first embodiment, the difference is explained below.

Processes executed by the control section 21 provided in the sleepiness determination device 20 of the sleep prevention system 1 in accordance with a third embodiment are explained below.

Figure 15:
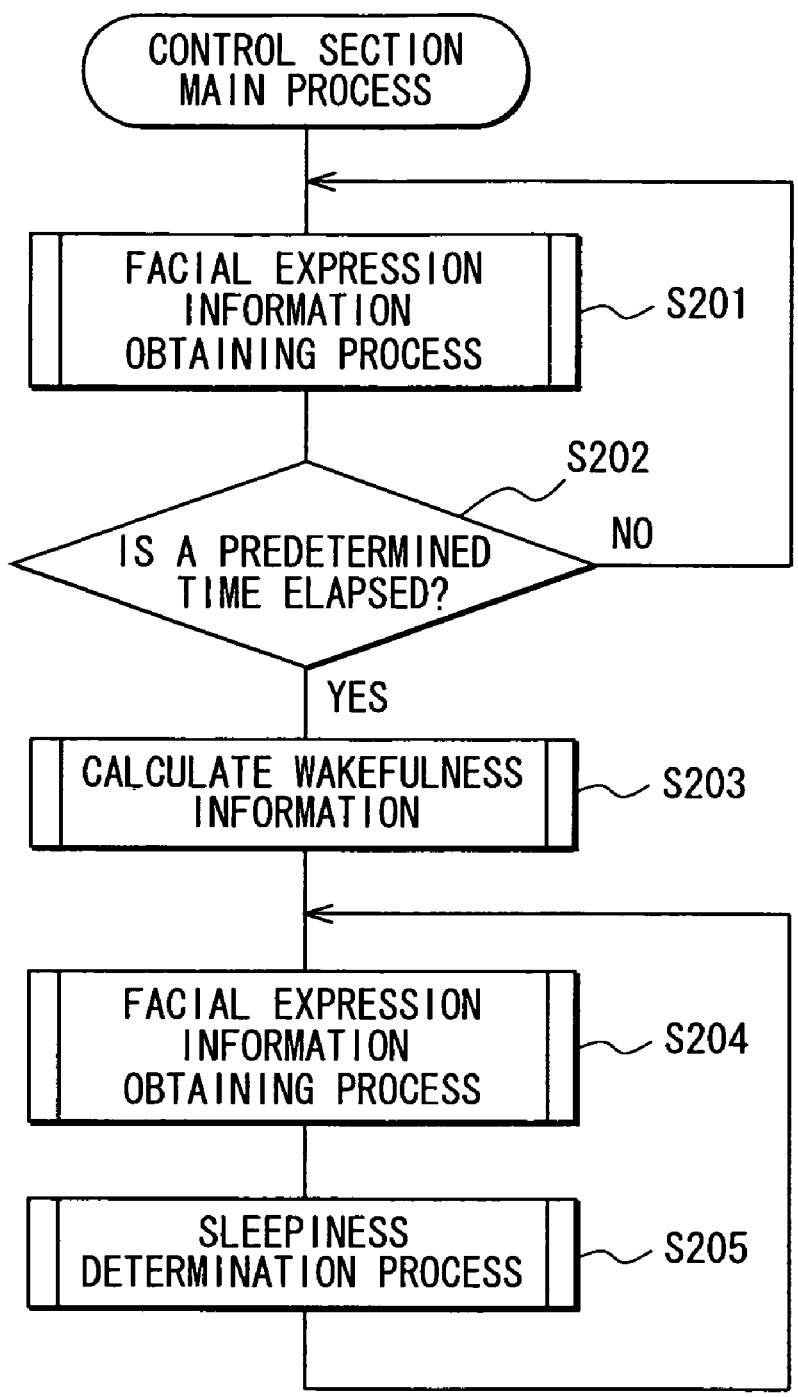
FIG. 15 is a flowchart illustrating an exemplary procedure of the control section main process in accordance with a third embodiment.

A procedure of the control section main process in accordance with a third embodiment is explained in reference to FIG. 15. The control section main process is started by pressing the start button provided in the input section 23.

First, in the control section main process, facial expression information obtaining process is performed at S201. In accordance with a facial image of the driver 3, captured by the imaging device 10, facial expression information is captures associated with the following quantities. For example, a distance between left and right corners of a mouth (L1); a distance between an eyebrow and eye (L2); a distance between the midpoint between inner corners of an eyebrow and the midpoint between inner corners of eyes (L3); a distance between inner corners of eyebrows (L4); a distance between the midpoint between lower corners of a nose and the midpoint between inner corners of eyes (L5); a distance between the midpoint between outer corners of a mouth and the midpoint between inner corners of eyes (L6); a distance between a lower edge of a lower lip and the midpoint between inner corners of eyes (L7); a distance between upper and lower eyelids (L8); a distance between left and right corners of a lower nose (L9); a distance between an upper edge of an upper lip and the midpoint between inner corners of eyes (L10); a back and forth tilt angle of a head (a); and a left and right tilt angle of a head (E), are calculated, and stored in the storage section 24. Facial expression information calculated at S201 is accumulated in the storage section 24 each time S201 is executed. The facial expression information obtaining process is explained in greater detail hereinafter.

Next, it is checked whether a predetermined time has elapsed at S202. When a predetermined time such as, for example, 5 min., has not elapsed corresponding to NO at S202, the process returns to S201 after a predetermined time, for example, 5 s. On the other hand, if the predetermined time has elapsed corresponding to YES at S202, the process proceeds to S203.

Next, wakefulness information is calculated as a standard for determining sleepiness at S203. Facial expression information stored in the storage section 24 multiple times at S201 is all read. Then, a normal distribution is produced using the read facial expression information. Since L1, L8, and L9 decrease as sleepiness increases, a standard value of the wakefulness information is set to a small value. A value corresponding to $\mu-2\alpha$ when a mean value of each of L1, L8, and L9 is μ and a standard deviation of each of L1, L8, and L9 is a is stored in the storage section 24 as the wakefulness information about each of L1, L8, and L9. On the other hand, a value corresponding to µ+2α in a normal distribution of each of L2-L7, L10, α, and θ is stored in the storage section 24 as the wakefulness information about each of L2 to L7, L10, α, and θ. Next, the facial expression information obtaining process is performed at S204. At S201, the facial expression information is calculated, and stored in the storage section 24.

The sleepiness determination process is performed for determining a sleepiness level of the driver 3 at S205. In the step, the wakefulness information calculated in 203 and facial expression information calculated at S204 are read from the storage section 24, and compared to each other to determine the sleepiness degree. The facial expression information calculated at S204 is then deleted from the storage section 24, and the process returns to S204.

The process terminates when the termination button of the input section 23 is pressed and when the driving section of the vehicle 2 stops, and the entire control of the vehicle terminates.

A procedure of the facial expression information obtaining process in accordance with a third embodiment is explained with reference to FIG. 16. The facial expression information obtaining process is performed at S201 and S204 in the control section main process. In the facial expression information obtaining process, image data showing a facial image captured by the imaging device 10 is obtained from the receiving section 22 at S221.

Next, in accordance with the image data obtained at S221, positional, angular information showing position and angles of components of a face is detected at S222. In S222 and in S43 of the facial expression information obtaining process in a first embodiment, positions of an inner corner of a left eye $(x_1, y_1, z_1)$, an inner corner of right eye $(x_2, y_2, z_2)$, a left outer corner of an eye $(x_3, y_3, z_3)$, an inner corner of a left eyebrow $(x_4, y_4, z_4)$, an inner corner of a right eyebrow $(x_5, y_5, z_5)$, a midpoint of an upper edge of a left eyebrow $(x_6, y_6, z_6)$, a left outer corner of a nasal opening $(x_7, y_7, z_7)$, for example, a corner disposed opposite to a right nasal opening, a right outer corner of a nasal opening $(x_8, y_8, z_8)$, for example, a corner disposed opposite to a left nasal opening, a left corner of a mouth $(x_9, y_9, z_9)$, a right corner of a mouth $(x_{10}, y_{10}, z_{10})$, a lower edge of a lower lip $(x_{11}, y_{11}, z_{11})$, an upper lid $(x_{12}, y_{12}, z_{12})$, a lower lid $(x_{13}, y_{13}, z_{13})$, and an upper edge of an upper lip $(x_{14}, y_{14}, z_{14})$, and information α about a back and forth tilt angle of a head and information θ about a left and right tilt angle of a head, are detected. The above α and θ are detected as positive values even when a head tilts in any of the back, forth, left, and right directions. In accordance with the detection results at S222, the above facial expression information L1 to L10 is calculated at S223.

It should be noted that L1 shows a distance between left and right outer corners of a mouth, and is calculated using the Equation 1 from above in accordance with the left and right outer corners of a mouth.

L2 shows a distance between an eyebrow and eye, such as a distance between the midpoint between an inner corner of a left eye and an outer corner of a left eye, and an upper edge of a left eyebrow, and is calculated using Equation 2 from above.

L3 shows a distance between the midpoint between inner corners of eyebrows and the midpoint between inner corners of eyes (a distance between the midpoint between inner corners of left and right eyebrows and the midpoint between inner corners of left and right eyes), and is calculated using the following equation.

$$L3=[((x_4+x_5)/2-(x_1+x_2)/2)^2+((y_4+y_5)/2-(y_1+y_2)/2)^2+((z_4+z_5)/2-(z_1+z_2)/2)^2]^{0.5} \quad (3)$$

L4 shows a distance between inner corners of eyebrows (a distance between inner corners of left and right eyebrows), and is calculated using the following equation.

$$L4=[(x_4-x_5)^2+(y_4-y_5)^2+(z_4-z_5)^2]^{0.5} \quad (4)$$

L5 shows a distance between the midpoint between lower corners of a nose and the midpoint between inner corners of eyes (a distance between the midpoint between an outer corner of a left nasal opening and an outer corner of a right nasal opening and the midpoint between inner corners of eyes), and is calculated using the following equation.

$$L5=[((x_7+x_8)/2-(x_1+x_2)/2)^2+((y_7+y_8)/2-(y_1+y_2)/2)^2+((z_7+z_8)/2-(z_1+z_2)/2)^2]^{0.5} \quad (5)$$

L6 shows a distance between the midpoint between outer corners of a mouth and the midpoint between inner corners of eyes (a distance between the midpoint between left and right outer corners of a mouth and the midpoint between inner corners of left and right eyes), and is calculated using the following equation.

$$L6=[((x_9+x_{10})/2-(x_1+x_2)/2)^2+(y_9+y_{10})/2-(y_1+y_2)/2)^2+((z_9+z_{10})/2-(z_1+z_2)/2)^2]^{0.5} \quad (6)$$

L7 shows a distance between a lower edge of a lower lip and the midpoint between inner corners of eyes (a distance between a lower edge of a lower lip and the midpoint between corners of left and right eyes), and is calculated using the following equation.

$$L7=[(x_{11}-(z_1+x_2)/2)^2+(y_{11}-(y_1+y_2)/2)^2+(z_{11}-(z_1+z_2)/2)^2]^{0.5} \quad (7)$$

L8 shows a distance between upper and lower eyelids, and is calculated using the following equation.

$$L8=[(x_{12}-x_3)^2+(y_{12}-y_{13})^2+(z_{12}-z_{13})^2]^{0.5} \quad (8)$$

L9 shows a distance between left and right outer corners of a lower nose (a distance between outer corners of left and right nasal openings), and is calculated using the following equation.

$$L9=[(x_7-x_8)^2+(y_7-y_8)^2+(z_7-z_8)^2]^{0.5} \quad (9)$$

Instead of a distance between outer corners of left and right nasal openings, a distance between outer corners of left and right nose wings may be used as L9. In the case, positions of outer corners of left and right nose wings may be detected at S222.

L10 shows a distance between an upper edge of an upper lip and the midpoint between inner corners of eyes (a distance between an upper edge of an upper lip and the midpoint between inner corners of left and right eyes), and is calculated using the following equation.

$$L10=[(x_{14}-(x_1+x_2)/2)^2+(y_{14}-(y_1+y_2)/2)^2+(z_{14}-(z_1+z_2)/2)^2]^{0.5} \quad (10)$$

Values of the calculated L1 to L10 and α, θ detected at S223 are stored in the storage section 24. Then, the process terminates, and execution returns to the control main process.

A procedure of the sleepiness determination process in accordance with a third embodiment is explained below in reference to FIG. 17. The sleepiness determination process is performed at S205 of the control section main process.

When the sleepiness determination process starts, it is determined whether sleepiness occurs from the facial expression information at S241. The wakefulness information L1 to L10, α, and θ calculated in 203 of the control section main process is compared to the facial expression information L1 to L10, α, and θ calculated in 204 to determine whether sleepiness occurs.

Table 1 shows correspondences among the facial expression information, wakefulness information, and the presence or absence of sleepiness.

TABLE 1

| Facial expression information | sleepiness level relative to wakefulness level |
|---|---|
| L1: distance between left and right corners of mouth | small |
| L2: distance between eyebrow and eye | large |
| L3: distance between the midpoint between inner corners of eyebrows and the midpoint between inner corners of eyes | large |
| L4: distance between inner corners of eyebrows | large |
| L5: distance between the midpoint between outer corners of a lower nose and the midpoint between inner corners of eyes | large |
| L6: distance between the midpoint between outer corners of a mouth and the midpoint between inner corners of eyes | large |
| L7: distance between a lower edge of a lower lip and the midpoint between inner corners of eyes | large |
| L8: distance between upper and lower eyelids | small |
| L9: distance between left and right corners of a lower nose | small |
| L10: distance between an upper edge of an upper lip and the midpoint between inner corners of eyes | large |
| α: back and forth tilt angle of a head | large |
| θ: left and right tilt angle of the head | large |

In accordance with the correspondence between the feature distances and sleepiness levels as shown in Table 1, it can be determined whether sleepiness occurs.

In the facial expression information used for determination at S241, the number of pieces of the facial expression information showing the presence of sleepiness is checked at S42. If the number of pieces of the facial expression information showing the presence of sleepiness is seven or over, corresponding to YES at S242, a sleepiness level 3 is determined to exist at S243, and the process proceeds to S249. If the number of pieces of the facial expression information showing the presence of sleepiness is not seven or over, corresponding to NO at S242, the process proceeds to S244.

Next, the number of pieces of the facial expression information showing the presence of sleepiness is checked at S244. If the number of pieces of the facial expression information showing the presence of sleepiness is five or over, corresponding to YES at S244, a sleepiness level 2 is determined to exist at S245, and the process proceeds to S249. If the number of pieces of the facial expression information showing the presence of sleepiness is not five or over, corresponding to NO at S244, the process proceeds to S246.

Next, the number of pieces of the facial expression information showing the presence of sleepiness is checked at S246. If the number of pieces of the facial expression information showing the presence of sleepiness is three or over, corresponding to YES at S246, a sleepiness level 1 is determined to exist at S247. If the number of pieces of the facial expression information showing the presence of sleepiness is not three or over, corresponding to NO at S246, sleepiness is determined to be at a sleepiness level 0 at S248 indicating no sleepiness. After that, the process proceeds to S249.

In accordance with the determined sleepiness degree, the output section 25 outputs a signal for operating the warning device 30, neck air conditioner 40, seatbelt vibrator 50, and brake controller 60 at S249, where the same process as at S77 of the sleepiness determination process of a first embodiment is performed. After that, the process terminates, and execution returns to the control section main process.

Also in the sleep prevention system 1 in accordance with a third embodiment, as well as in a first and second embodiment, even when a sleepiness degree cannot be determined from only eye information, a sleepiness degree can be determined easily without attaching an electrode for detecting motions of facial expression to a target person whose sleepiness is to be determined. In the present embodiment, since sleepiness is determined from more pieces of the facial expression information than those in a first and a second embodiment, the determination results are more reliable.

Figure 16:
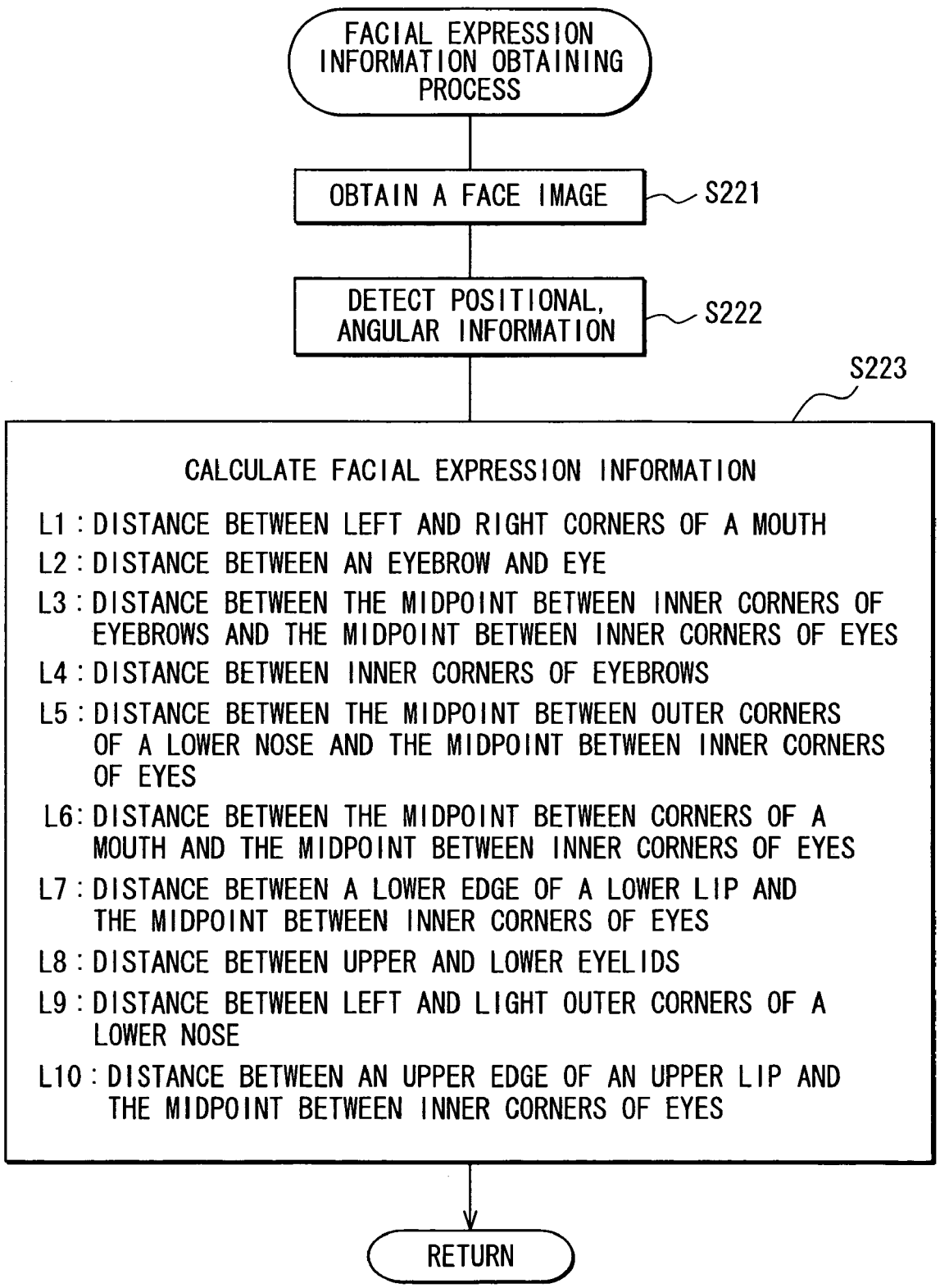
FIG. 16 is a flowchart illustrating an exemplary procedure of the facial expression information obtaining process in accordance with a third embodiment.
Figure 17:
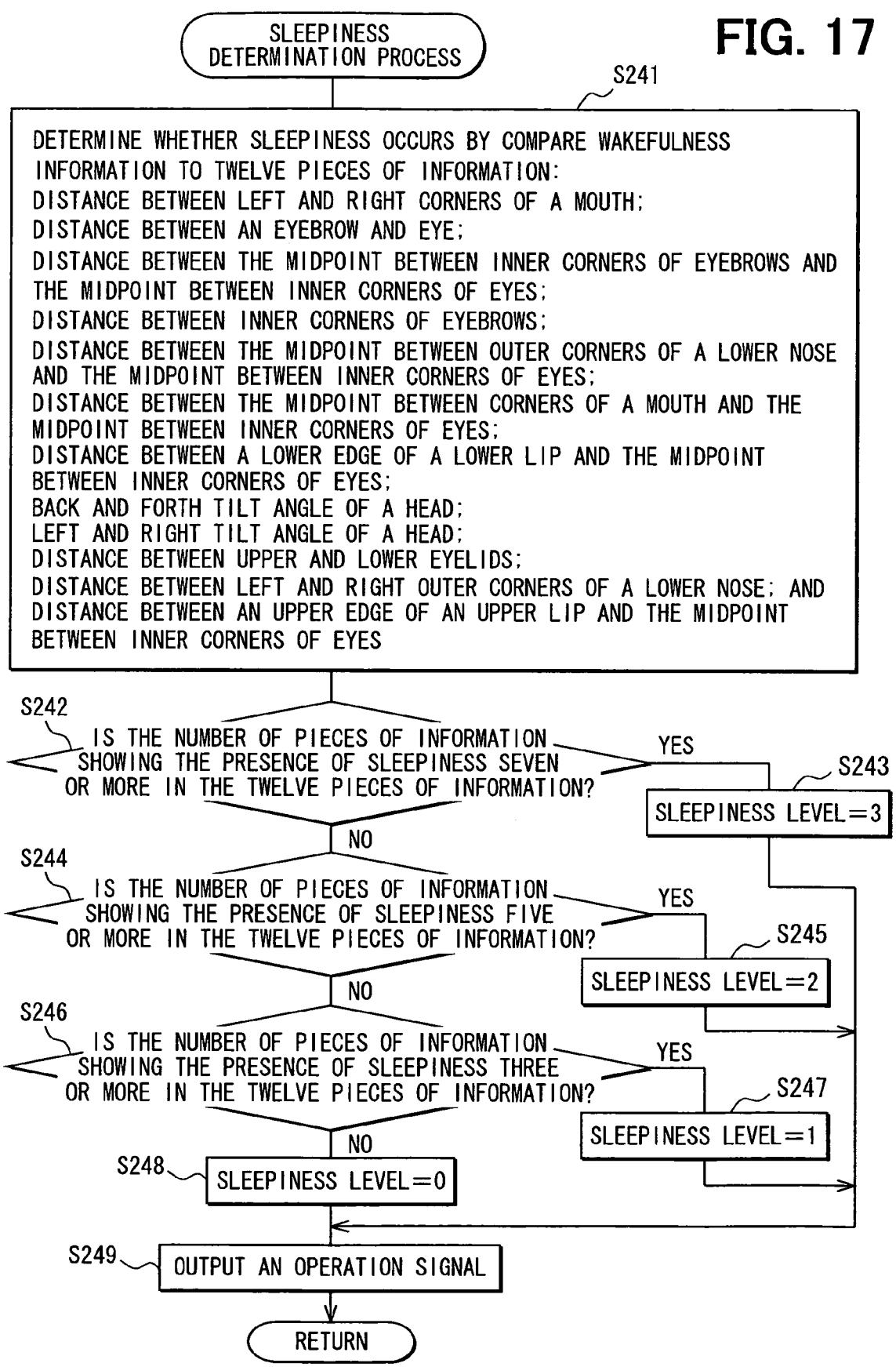
FIG. 17 is a flowchart illustrating an exemplary procedure of the sleepiness determination process in accordance with a third embodiment.

In the above-described embodiment, S222 and S223 shown for example in FIG. 16, correspond to exemplary procedures performed in accordance with the facial expression information obtaining means, the sleepiness determination process in FIG. 17 correspond to exemplary procedures performed in accordance with the sleepiness determination means in accordance with the present invention, and the imaging device 10 corresponds to the imaging means in accordance with various exemplary embodiments of the present invention.

Fourth Embodiment

Figure 18:
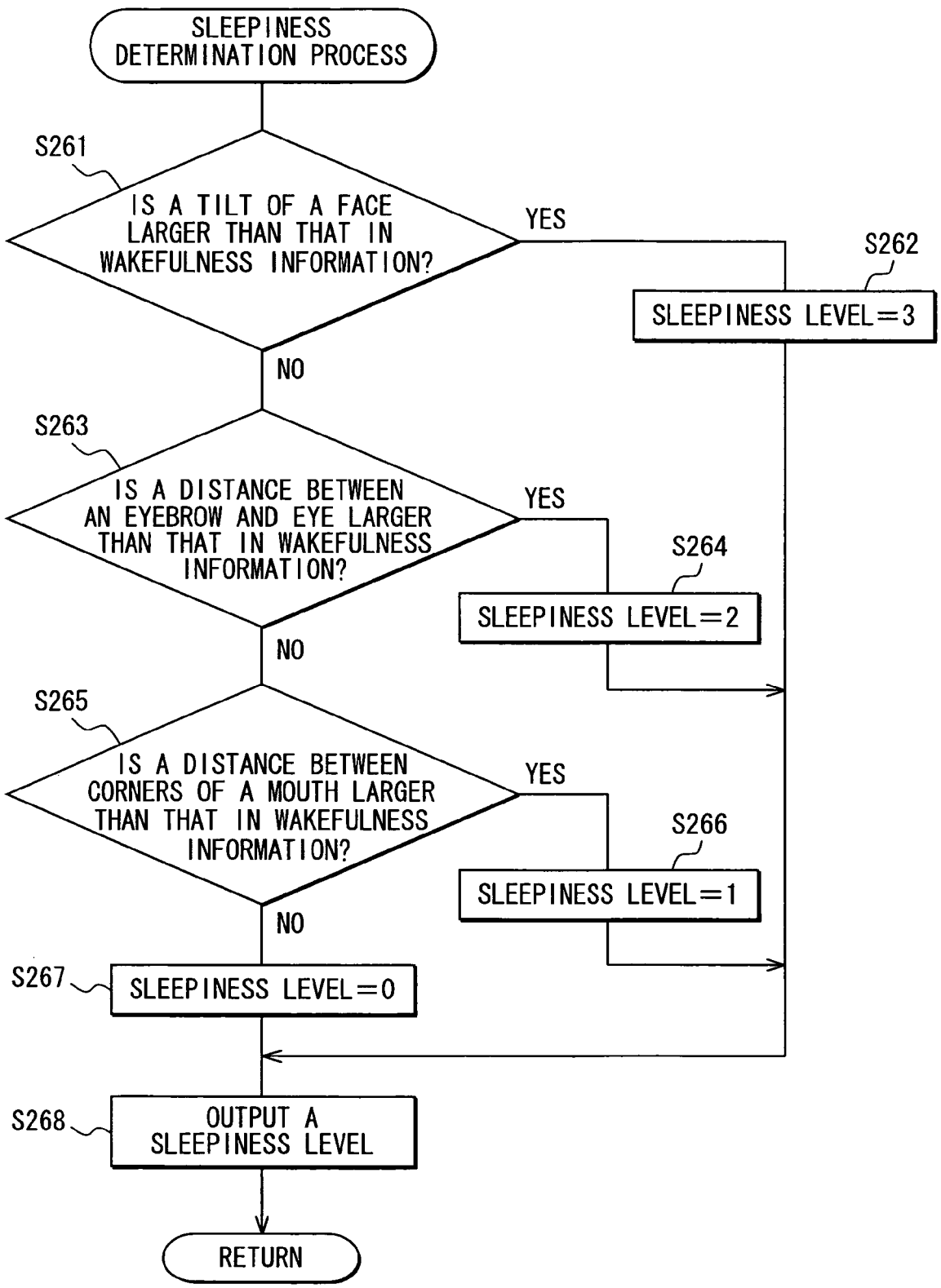
FIG. 18 is a flowchart illustrating an exemplary procedure of the sleepiness determination process in accordance with a fourth embodiment.
Figure 19A:
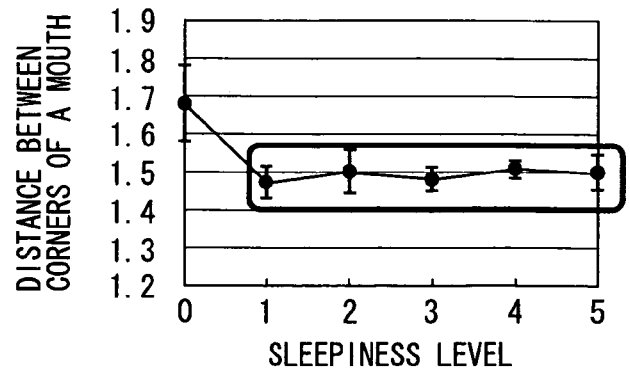
FIG. 19A, FIG. 19B, FIG. 19C, and FIG. 19D are graphs illustrating experimental results associated with the relationship between sleepiness facial expression features and sleepiness levels.
Figure 19B:
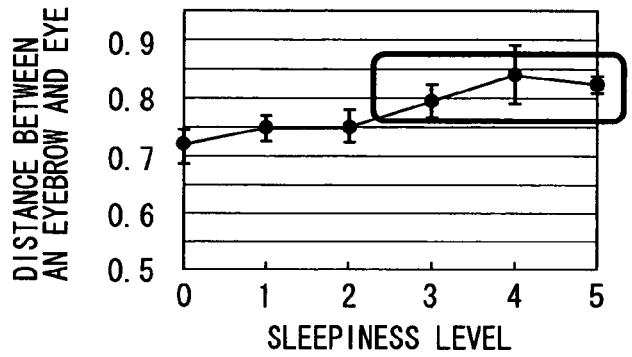
Figure 19C:
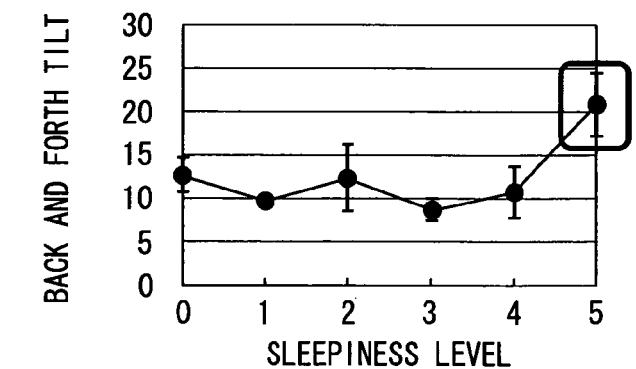
Figure 19D:
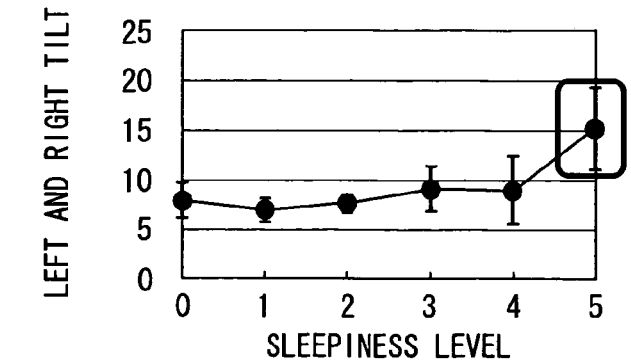
Figure 20:
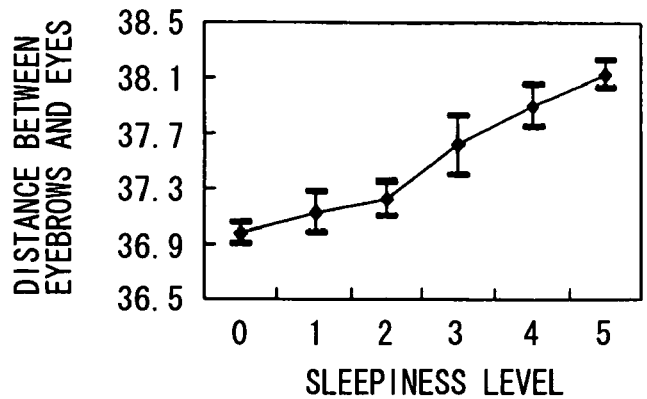
FIG. 20 is a graph illustrating an exemplary relationship between sleepiness levels, and a distance between the midpoint between inner corners of eyebrows and the midpoint between inner corners of eyes.
Figure 21:
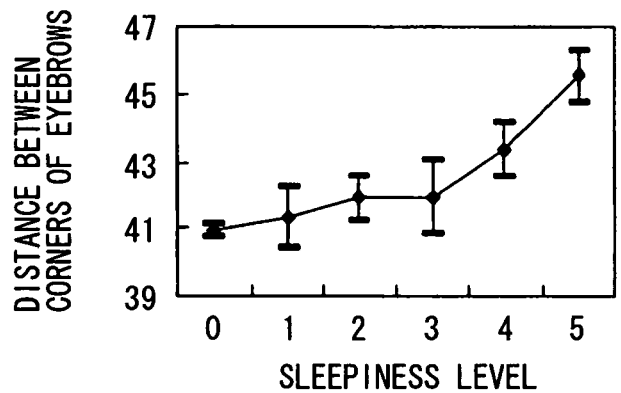
FIG. 21 is a graph illustrating a relationship between sleepiness levels and a distance between inner corners of eyebrows.
Figure 22:
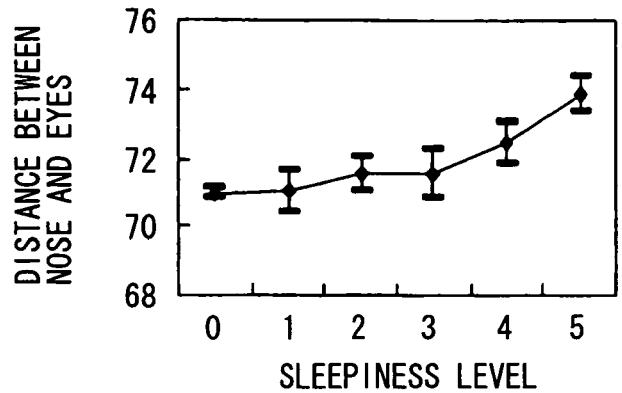
FIG. 22 is a graph illustrating a relationship between sleepiness levels, and a distance between the midpoint between corners of a lower nose and the midpoint between inner corners of eyes.
Figure 23:
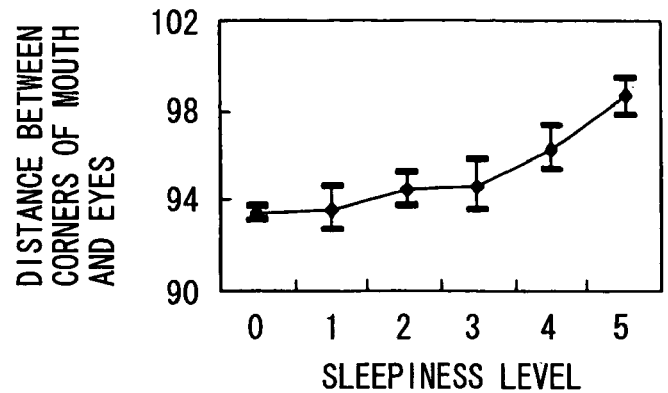
FIG. 23 is a graph illustrating a relationship between sleepiness levels, and a distance between the midpoint between outer corners of a mouth and the midpoint between inner corners of eyes.
Figure 24:
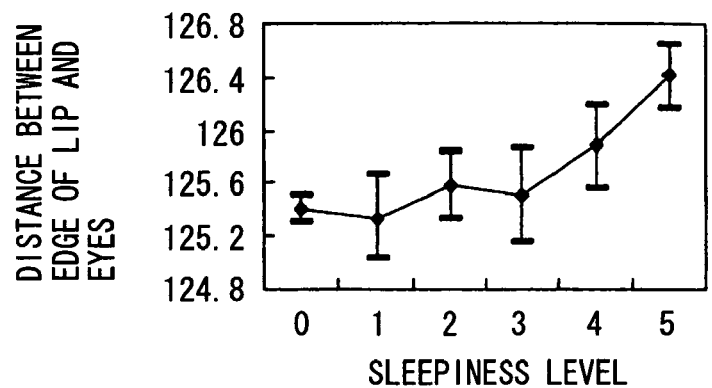
FIG. 24 is a graph illustrating a relationship between sleepiness levels, and a distance between a lower edge of a lower lip and the midpoint between inner corners of eyes.

In accordance with a fourth embodiment, the sleep prevention system 1 can have the essential structure as described in accordance with a third embodiment, and the control section main process and facial expression information obtaining process can be essentially as described in accordance with a third embodiment. However, instead of the sleepiness determination process in accordance with a third embodiment, an exemplary sleepiness determination process, as explained in greater detail herein below can be executed by the control section 21 of the sleep prevention system 1 in accordance with a fourth embodiment with reference to FIG. 18. The process is performed at S205 of the control section main process of a third embodiment.

In the exemplary sleepiness determination process, it is first determined whether a tilt of a face is larger than that of the wakefulness information at S261. More specifically, the wakefulness information α and θ calculated at S203 of the control section main process and the facial expression information α and θ calculated at S204 are compared to each other. When the facial expression information α or θ is larger than the wakefulness information corresponding to YES at S261, a sleepiness level 3 is determined to exist at S262, and the process proceeds to S268. When none of the facial expression information α and θ is larger than the wakefulness information corresponding to NO at S261, the process proceeds to S263.

Next, it is determined whether a distance between an eyebrow and eye is larger than that of the wakefulness information at S263. More specifically, the wakefulness information L2 calculated at S203 of the control section main process and the facial expression information L2 calculated at S204 are compared to each other. When the facial expression information L2 is larger than the wakefulness information corresponding to YES at S263, a sleepiness level 2 is determined to exist at S263, and the process proceeds to S268. On the other hand, when the facial expression information L2 is not larger than the wakefulness information corresponding to NO at S263, the process proceeds to S265.

Next, it is determined whether a distance between outer corners of a mouth is smaller than that of the wakefulness information at S265. More specifically, the wakefulness information L1 calculated at S203 of the control section main process and the facial expression information L1 calculated at S204 are compared to each other. If the facial expression information L1 is smaller than the wakefulness information, corresponding to YES at S265, a sleepiness level 1 is determined to exist at S266. If the facial expression information L1 is not smaller than the wakefulness information corresponding to NO at S265, a sleepiness level 0 is determined to exist at S267 indicating no sleepiness. Then, the process proceeds to S268.

In accordance with the determined sleepiness degree, the output section 25 outputs a signal for operating the warning device 30, neck air conditioner 40, seatbelt vibrator 50, and brake controller 60 at S268. In the step, the same process as S77 of the sleepiness determination process of a first embodiment is performed. After that, the process terminates, execution returns to the control section main process.

As described in connection with previous embodiments, in the sleep prevention system 1 of a fourth embodiment, even when sleepiness cannot be determined from only eye information, a sleepiness degree can be determined easily without attaching an electrode for detecting motions of facial expression to a target person whose sleepiness is to be determined.

Alternative Embodiments

It will be appreciate that the present invention is not limited to the above described embodiments. Various modifications are possible within the technical scope of the present invention. For example, in the above embodiments, an exemplary structure has been described in which motions of a face are obtained in accordance with image data showing a facial image captured by the imaging device 10. As long as motions of a face can be obtained, the structure for obtaining such motion information is not limited.

For example, an electrode may be attached to a face to detect slight electricity generated in proportion to a strength of motion of muscle of the face to obtain the relaxation around a mouth, rise of an eyebrow, and tilt of a head.

Further, In the above described embodiments, an exemplary structure has been described in which the process associated with the sleepiness determination device 20 is started by pressing the start button provided to the input section 23. However it will be appreciated that the process associated with the sleepiness determination device 20 may be started when another condition is satisfied.

For example, a structure is possible in which the process starts just when the driving section such as the engine of the vehicle 2 activates. Another structure is possible in which the process starts when a vehicle speed sensor provided in the vehicle to measure a speed of the vehicle detects the speed over a predetermined speed such as, for example, 30 km/h.

In the above described embodiments, an exemplary structure has been described in which the information a about a back and forth tilt of a head and the information $\theta$ about a left and right tilt of a head are both obtained. However, in alternative exemplary embodiments, only one of $\alpha$ and $\theta$ may be obtained.

The above described embodiments show the structure in which a sleepiness degree is determined from one or several factors such as a distance between left and right corners of a mouth, a distance between an eyebrow and eye, a tilt angle of a head, a distance between the midpoint between inner corners of eyebrows and the midpoint between inner corners of eyes, a distance between inner corners of eyebrows, a distance between the midpoint between corners of a lower nose and the midpoint between inner corners of eyes, a distance between the midpoint between outer corners of a mouth and the midpoint between inner corners of eyes, a distance between a lower edge of a lower lip and the midpoint between inner corners of eyes, a distance between upper and lower eyelids, a distance between left and right corners of a lower nose, and a distance between an upper edge of an upper lip and the midpoint between inner corners of eyes. However, a line of sight may be detected, and sleepiness may be detected in accordance with the line of sight, and from the detection result and the above information, a sleepiness level may be determined.

The sleepiness determination process in accordance with a third embodiment has been described in connection with a structure in which the presence or absence of sleepiness is determined from as many as twelve pieces of the facial expression information. A sleepiness degree is determined in accordance with the number of pieces of the facial expression information showing that sleepiness occurs. However, in various alternative exemplary embodiments, the number of pieces the facial expression information for determining the presence or absence of sleepiness is not limited to twelve, and a threshold for a sleepiness degree is not limited to seven, five, or three.

The above described sleepiness determination process may have a structure in which, instead of the presence or absence of sleepiness, a sleepiness level is determined from the facial expression information. In the case, a sleepiness degree may be determined from a mean of sleepiness levels and from a mode of sleepiness levels. The sleepiness level may be determined by the difference from the wakefulness information. In accordance with a fourth embodiment an exemplary structure is described in which a sleepiness level is determined from a tilt angle of a head such as the tilt of a face, a distance between an eyebrow and eye, and a distance between left and right outer corners of a mouth. However, in accordance with alternative exemplary embodiments, a sleepiness degree may be determined from other facial expression information. The comparison between the wakefulness information and facial expression information may be performed by significance determination using statistical testing.

A tendency of the above sleepiness facial expression features to be correlated with sleepiness levels and thus to function as indicators of a sleepiness level is explained below in connection with experimental results confirming the correlation.

In accordance with the experiment, facial changes of a target person from a wakefulness state to a sleep state are captured continuously. An estimator classifies a sleepiness level of the target person into levels zero to five by sensory evaluation in accordance with the captured images.

In connection with each sleepiness level, each factor including a distance between left and right corners of a mouth, a distance between an eyebrow and eye, a back and forth tilt angle of a head, a left and right tilt angle of a head, a distance between the midpoint between inner corners of eyebrows and the midpoint between inner corners of eyes, a distance between inner corners of eyebrows, a distance between the midpoint between corners of a lower nose and the midpoint between inner corners of eyes, a distance between the midpoint between outer corners of a mouth and the midpoint between inner corners of eyes, a distance between a lower edge of a lower lip and the midpoint between inner corners of eyes, a distance between upper and lower eyelids, a distance between outer corners of left and right nasal openings, and a distance between an upper edge of an upper lip and the midpoint of inner corners of eyes, is measured about ten times.

A state of no sleepiness is a level 0, a state of slight sleepiness is a level 1, a state of moderate sleepiness is a level 2, a state of strong sleepiness is a level 3, a state of intolerable sleepiness is a level 4, and a state of sleep is a level 5.

FIG. 19A to FIG. 19D show graphs of measurement results of a distance between left and right corners of a mouth, a distance between an eyebrow and eye, a back and forth tilt angle of a head, and a left and right tilt angle of a head. Each graph shows a sleepiness level on a horizontal axis and a relative distance when a distance between inner corners of eyes is ten on a vertical axis.

In each measurement result, a portion surrounded by the thick frame is determined to have a significant difference from a paired t-test for a measurement result of a sleepiness level 0 and measurement results of other sleepiness levels. The paired t-test is performed under the condition that a level of significance is five percent in case of using a distance between left and right corners of a mouth and a tilt angle of a head, and is one percent in case of using a distance between an eyebrow and eye.

As shown in FIG. 19A to FIG. 19D, a significant difference is recognized in a distance between left and right corners of a mouth from a sleepiness level 1, a significant difference is recognized in a distance between an eyebrow and eye from a sleepiness level 3, and a significant difference is recognized in a tilt angle of a head from a sleepiness level 5.

As described above, the changes of the relaxation around a mouth, rise of eyebrows, and a tilt of a head show different sleepiness levels. Accordingly, the combinations of these facial expression features can realize the determination of more sleepiness levels than those by the determination using one of the features.

Figure 25:
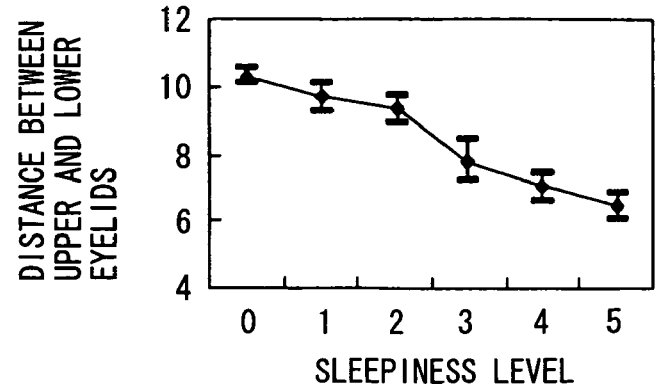
FIG. 25 is a graph illustrating a relationship between sleepiness levels, and a distance between upper and lower eyelids.
Figure 26:
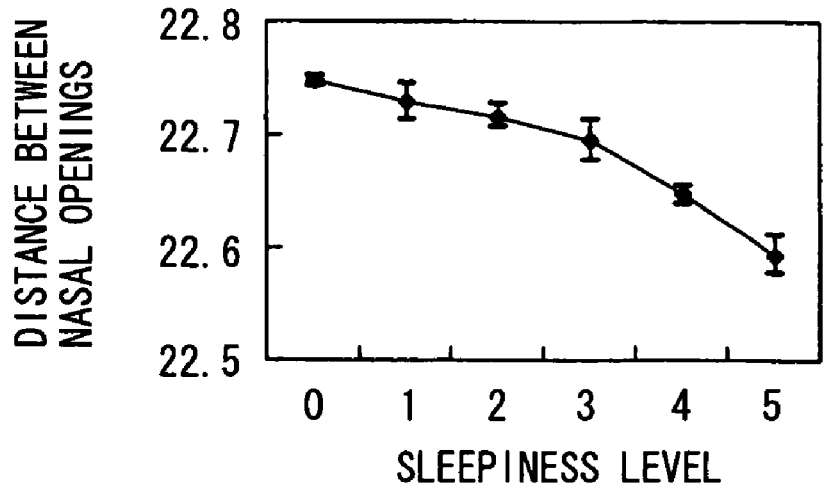
FIG. 26 is a graph illustrating a relationship between sleepiness levels, and a distance between outer corners of left and right nasal openings.
Figure 27:
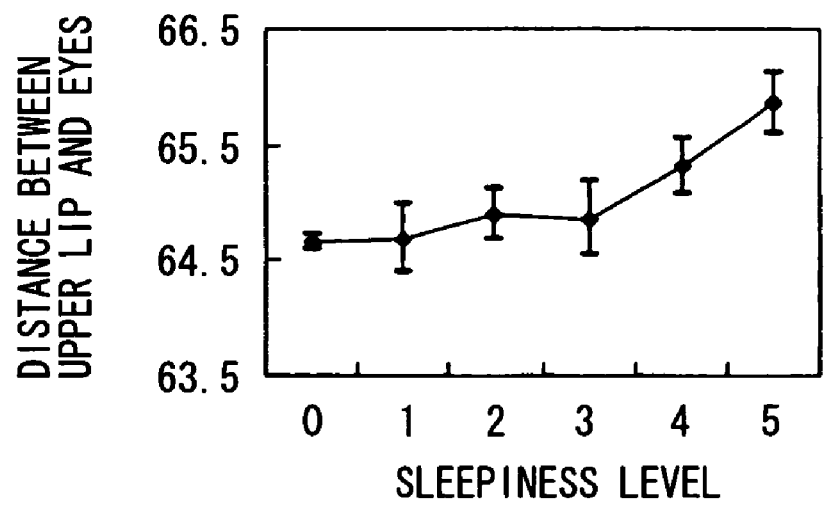
FIG. 27 is a graph illustrating a relationship between sleepiness levels, and a distance between an upper edge of an upper lip and the midpoint between inner corners of eyes.

FIG. 20 to FIG. 27 show measurement results of a distance between the midpoint between inner corners of eyebrows and the midpoint between inner corners of eyes, a distance between inner corners of eyebrows, a distance between the midpoint between outer corners of a lower nose and the midpoint between inner corners of eyes, a distance between the midpoint between corners of a mouth and the midpoint between inner corners of eyes, a distance between a lower edge of a lower lip and the midpoint between inner corners of eyes, a distance between upper and lower eyelids, a distance between outer corners of left and right nasal openings, and a distance between an upper edge of an upper lip and the midpoint between inner corners of eyes. In FIG. 20 to FIG. 24, and FIG. 27, the distances increase as sleepiness increases. In FIG. 25 and FIG. 26, the distances decrease as sleepiness increases. Accordingly, a sleepiness degree can be determined by the various exemplary embodiments discussed and described herein above.

What is claimed is:

1. A sleepiness determination device comprising:
   facial expression information obtaining means for obtaining at least two of facial expression information elements (A) to (K) associated with a facial image including:
   (A) a distance between left and right corners of a mouth;
   (B) a distance between an eyebrow and eye;
   (C) a tilt angle of a head;
   (D) a distance between the midpoint between inner corners of eyebrows and the midpoint between inner corners of eyes;
   (E) a distance between inner corners of eyebrows;
   (F) a distance between the midpoint between outer corners of a lower nose and the midpoint between inner corners of eyes;
   (G) a distance between the midpoint between corners of a mouth and the midpoint between inner corners of eyes;
   (H) a distance between a lower edge of a lower lip and the midpoint between inner corners of eyes;
   (I) a distance between upper and lower eyelids;
   (J) a distance between outer corners of a lower nose; and
   (K) a distance between an upper edge of an upper lip and the midpoint between inner corners of eyes; and
   sleepiness determination means for:
   determining a respective indication of sleepiness for each of the at least two facial expression information elements; and
   determining a level of sleepiness based on the respective indication of sleepiness for the each of the at least two facial expression information elements, wherein
   the sleepiness determination means obtains the (C) tilt angle of the head in addition to the at least two of the facial expression information elements (A) to (K) other than the (C) tilt angle of the head, the at least two of the facial expression information elements (A) to (K) including the (A) distance between the left and right corners of the mouth and the (B) distance between the eyebrow and the eye;
   a first condition includes that sleepiness is determined to be present based on the (A) distance between left and right corners of a mouth, a second condition includes that sleepiness is determined to be present based on the distance (B) between an eyebrow and eye and based on the first condition, and a third condition includes that sleepiness is determined to be present based on the (C) tilt angle of a head and based on the first and second conditions, and
   the level of sleepiness is determined as slight sleepiness when the only first condition is satisfied, the level of sleepiness is determined as moderate sleepiness higher than the slight sleepiness when only the second condition is satisfied and the level of sleepiness is determined as strong sleepiness higher than the moderate sleepiness when only the third condition is satisfied, and the level of sleepiness is determined as no sleepiness when none of the conditions are satisfied.

2. The sleepiness determination device of claim 1, wherein the sleepiness determination means determines the respective indication of sleepiness by comparing the facial expression information obtained during wakefulness and the at least two of the facial expression information elements (A) to (K) obtained at a time at which sleepiness is to be determined, and determines the level of sleepiness from a combination of results of the determination.

3. The sleepiness determination device of claim 1, wherein the facial expression information obtaining means further detects positional and angular information associated with the facial image, and obtains the at least two of the facial expression information elements (A) to (K) in accordance with the positional and angular information.

4. The sleepiness determination device of claim 3, wherein the sleepiness determination device is mounted and used in a vehicle, and the facial expression information obtaining means detects the positional and angular information based on the facial image data captured by imaging means provided to the vehicle.

5. A sleepiness determination device comprising:
   a processor; and
   a memory coupled to the processor, the memory storing facial expression information obtained from a reference facial image obtained during a wakefulness state;

facial expression information obtaining means for obtaining at least two facial expression information elements associated with a facial image obtained during operation of a vehicle; and sleepiness determination means for:

determining a respective indication of sleepiness for each of the at least two facial expression information elements by comparing the each of the at least two facial expression information elements during operation of the vehicle with the stored facial expression information; and determining a level of sleepiness based on a combination of the respective indication for the each, wherein the respective indication of sleepiness associated with a first condition is determined based on a facial expression information element (A) distance between left and right corners of a mouth, the respective indication of sleepiness associated with a second condition is determined based on a facial expression information element (B) distance between an eyebrow and eye and based on the first condition, and the respective indication of sleepiness associated with a third condition is determined based on a facial expression information element (C) tilt angle of a head and based on the first and second conditions, and the level of sleepiness is determined as slight sleepiness when the only first condition is satisfied, the level of sleepiness is determined as moderate sleepiness higher than the slight sleepiness when only the second condition is satisfied and the level of sleepiness is determined as strong sleepiness higher than the moderate sleepiness when only the third condition is satisfied, and the level of sleepiness is determined as no sleepiness when none of the conditions are satisfied.

6. A sleepiness determination device comprising:

facial expression information obtaining means for obtaining at least two of facial expression information elements associated with a facial image including
   (A) a distance between left and right corners of a mouth,
   (B) a distance between an eyebrow and eye, and
   (C) a tilt angle of a head; and sleepiness determination means for determining a degree of sleepiness for each of the facial expression information elements by using three conditions (a), (b) and (c), by which presence of sleepiness is determined based on the facial expression information elements (A), (B) and (C), respectively, wherein the sleepiness determination means determines the degree of sleepiness to be
   strong sleepiness when the condition (c) is satisfied,
   moderate sleepiness, which is lower than the strong sleepiness, when the condition (b) is satisfied but the condition (c) is not satisfied,
   slight sleepiness, which is lower than the moderate sleepiness, when the condition (a) is satisfied but the conditions (b) and (c) are not satisfied, and
   no sleepiness when none of the conditions (a), (b) and (c) is satisfied.

7. The sleepiness determination device according to claim 6, wherein:

the sleepiness determination means determines the presence or absence of sleepiness by comparing the facial expression information obtained during wakefulness and the facial expression information obtained at a sleepiness determination time, at which sleepiness is to be determined, and determines the degree of sleepiness based on a combination of results of determinations of the presence or absence of sleepiness.

8. The sleepiness determination device according to claim 6, wherein:

the facial expression information obtaining means further detects at least positional and angular information associated with the facial image based on image data indicating a face image, and obtains the facial expression information.

9. The sleepiness determination device according to claim 8, wherein:

the sleepiness determination device is mounted and used in a vehicle; and the facial expression information obtaining means detects the positional and angular information based on facial image data captured by imaging means provided to the vehicle.

* * * * *